US010317545B2

(12) United States Patent
Aeron et al.

(10) Patent No.: US 10,317,545 B2
(45) Date of Patent: Jun. 11, 2019

(54) METHODS AND APPARATUS FOR WAVEFORM PROCESSING

(71) Applicant: Schlumberger Technology Corporation, Sugar Land, TX (US)

(72) Inventors: Shuchin Aeron, Brookline, MA (US); Sandip Bose, Brookline, MA (US); Henri-Pierre Valero, Yokohama (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 867 days.

(21) Appl. No.: 13/712,985

(22) Filed: Dec. 13, 2012

(65) Prior Publication Data

US 2013/0238248 A1 Sep. 12, 2013

Related U.S. Application Data

(60) Provisional application No. 61/609,891, filed on Mar. 12, 2012.

(51) Int. Cl.
*G01V 1/28* (2006.01)
*G01V 1/36* (2006.01)

(52) U.S. Cl.
CPC .................. *G01V 1/28* (2013.01); *G01V 1/36* (2013.01); *G01V 1/364* (2013.01); *G01V 2210/32* (2013.01); *G01V 2210/324* (2013.01)

(58) Field of Classification Search
CPC ........................................................ G01V 1/28
USPC ............................................................ 702/17
See application file for complete search history.

(56) References Cited

U.S. PATENT DOCUMENTS

| | | | | |
|---|---|---|---|---|
| 4,594,691 A * | 6/1986 | Kimball | G01V 1/48 367/26 |
| 4,760,563 A * | 7/1988 | Beylkin | G01V 1/32 367/43 |
| 6,188,961 B1 * | 2/2001 | Mandal | G01V 1/50 702/6 |
| 6,636,810 B1 * | 10/2003 | Moore | G01V 1/364 702/17 |
| 6,691,039 B1 * | 2/2004 | Wood | G01V 1/364 702/16 |
| 7,561,491 B2 * | 7/2009 | Robinson | G01V 1/364 367/24 |
| 7,643,374 B2 | 1/2010 | Plona et al. | |
| 2004/0006428 A1 * | 1/2004 | Hsu | G01V 1/48 702/11 |

(Continued)

FOREIGN PATENT DOCUMENTS

WO 2010/075412 7/2010

OTHER PUBLICATIONS

G. Beylkin, "Discrete radon transform," IEEE Transaction on Acoustics, Speech and Signal Processing, vol. ASSP-35, No. 2, pp. 162-172. Feb. 1987.

(Continued)

*Primary Examiner* — Alexander Satanovsky
*Assistant Examiner* — Lina M Cordero

(57) ABSTRACT

Methods and apparatus for waveform processing are disclosed. An example method includes determining shrinkage estimators in a Discrete Radon transform domain based on semblance of waveform data and de-noising the waveform data using a processor and the shrinkage estimators to enable the identification of weak signals in the waveform data.

23 Claims, 18 Drawing Sheets

1700
START
1702 TRANSMIT SIGNALS
1704 OBTAIN WAVEFORM DATA ASSOCIATED WITH SIGNALS
1706 DETERMINE SHRINKAGE ESTIMATORS IN DISCRETE RADON TRANSFORM DOMAIN
1708 DE-NOISE WAVEFORM DATA USING SHRINKAGE ESTIMATORS
1710 ESTIMATE INTERFERENCES
1712 REMOVE INTERFERENCES FROM WAVEFORM DATA
1714 ESTIMATE SLOWNESSES
1716 PRODUCE SLOWNESS TIME-COHERENCE PLOT
END?
NO
YES
END

(56) References Cited

U.S. PATENT DOCUMENTS

| | | | | |
|---|---|---|---|---|
| 2005/0135188 | A1* | 6/2005 | Wood | G01V 1/364 367/47 |
| 2006/0083108 | A1* | 4/2006 | Wu | G01V 1/48 367/31 |
| 2007/0097788 | A1* | 5/2007 | Tang | G01V 1/28 367/52 |
| 2009/0067286 | A1* | 3/2009 | Bose | G01V 1/48 367/38 |
| 2009/0259404 | A1* | 10/2009 | Hirabayashi | G01V 1/48 702/9 |
| 2010/0157731 | A1* | 6/2010 | Aeron | G01V 1/30 367/38 |
| 2010/0212909 | A1* | 8/2010 | Baumstein | G01V 11/00 166/369 |
| 2012/0109528 | A1* | 5/2012 | Bolshakov | E21B 47/0002 702/9 |
| 2013/0021873 | A1* | 1/2013 | Mattocks | G01V 1/36 367/24 |
| 2013/0163377 | A1* | 6/2013 | Poole | G01V 1/368 367/24 |

OTHER PUBLICATIONS

P.C. Hansen, "Rank-deficient and discrete ill-posed problems: numerical aspects of linear inversion," Philadelphia, PA, USA, Society for Industrial and Applied Mathematics, 1998.

C. Kimball, T. Marzetta, "Semblance processing of borehole acoustic array data," Geophysics, vol. 49, No. 3,, pp. 264-281, Mar. 1984.

T. Kinoshita, T. Endo, H. Nakajima, H. Yamamoto, A. Dumont, A. Hawthorne, "Next generation LWD sonic tool," in the 14th Formation Evaluation Symposium of Japan, 2008.

D. Slepian, "Prolate spheroidal wave functions, forier analysis, and auncertainty, V—the discrete case," Bell System Technical Journal, vol. 57, pp. 1371-1430, May-Jun. 1978.

A. Averbuch, R.R. Coifman, D.L. Donobo, M. Israeli, J. Walden, "Fast slant stack: A notion of radon transform for data in a Cartesian grid which is rapidly computable, algebraically exact, geometrically faithful and invertible," Technical report, Stanford University, Dept. of Statistics.

E.J. Candes, "Modern Statistical Estimation via Oracle Inequalities, "Acta Numerica, pp. 1-69.

E.J. Candes, D.L. Donoho, Recovering edges in ill-posed inverse problems: Optimality of curvelet frames, Annals of Statistics, 30:784842.

O. Christensen, "An introduction to frames and Riesz bases," Birkhauser.

I. Daubechies, "Ten Lectures on Wavelets," Society for Industrial and Applied Mathematics, ISBN 0-89871-274-2.

C. Flammer, "Spheroidal Wave Functions," Stanford University Press, Stanford, CA.

G. Golub, P.C. Hansen, Dianne, "Tikhonov regularization and total least squares," SIAM J. Matrix and Appl., 21:185-194.

S. Lang, A. Kurkjian, J. McClellan, C. Morris, T. Parks, "Estimating slowness dispersion from arrays of sonic logging waveforms," Geophysics, 52: 530-544.

* cited by examiner

METHODS AND APPARATUS FOR WAVEFORM PROCESSING

RELATED APPLICATION

This patent claims priority to U.S. Provisional Application No. 61/609,891 filed on Mar. 12, 2012, which is hereby incorporated herein by reference in its entirety.

BACKGROUND

Sonic logging data may be obtained while drilling. However, because of the noise created during such drilling operations, logs produced may have low semblance.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

An example method in accordance with the teachings of this disclosure includes determining shrinkage estimators in a Discrete Radon transform domain based on semblance of waveform data and de-noising the waveform data using a processor and the shrinkage estimators to enable the identification of weak signals in the waveform data.

An example method in accordance with the teachings of this disclosure includes processing waveform data using a processor to remove noise and interferences from the waveform data. The noise is to be removed using shrinkage estimators in a Discrete Radon transform domain. The interferences are to be estimated using time-frequency compact space-time propagators.

An example apparatus in accordance with the teachings of this disclosure includes sources spaced from a receiver. The sources to transmit signals and the receiver to receive at least a portion of the signals. The apparatus includes a processor to process waveform data to remove noise from the waveform data. The waveform data is associated with the signals. The noise is to be removed using shrinkage estimators in a Discrete Radon transform domain.

BRIEF DESCRIPTION OF THE DRAWINGS

Embodiments of systems and methods for waveform processing are described with reference to the following figures. The same numbers are used throughout the figures to reference like features and components.

DETAILED DESCRIPTION

Figure 1:
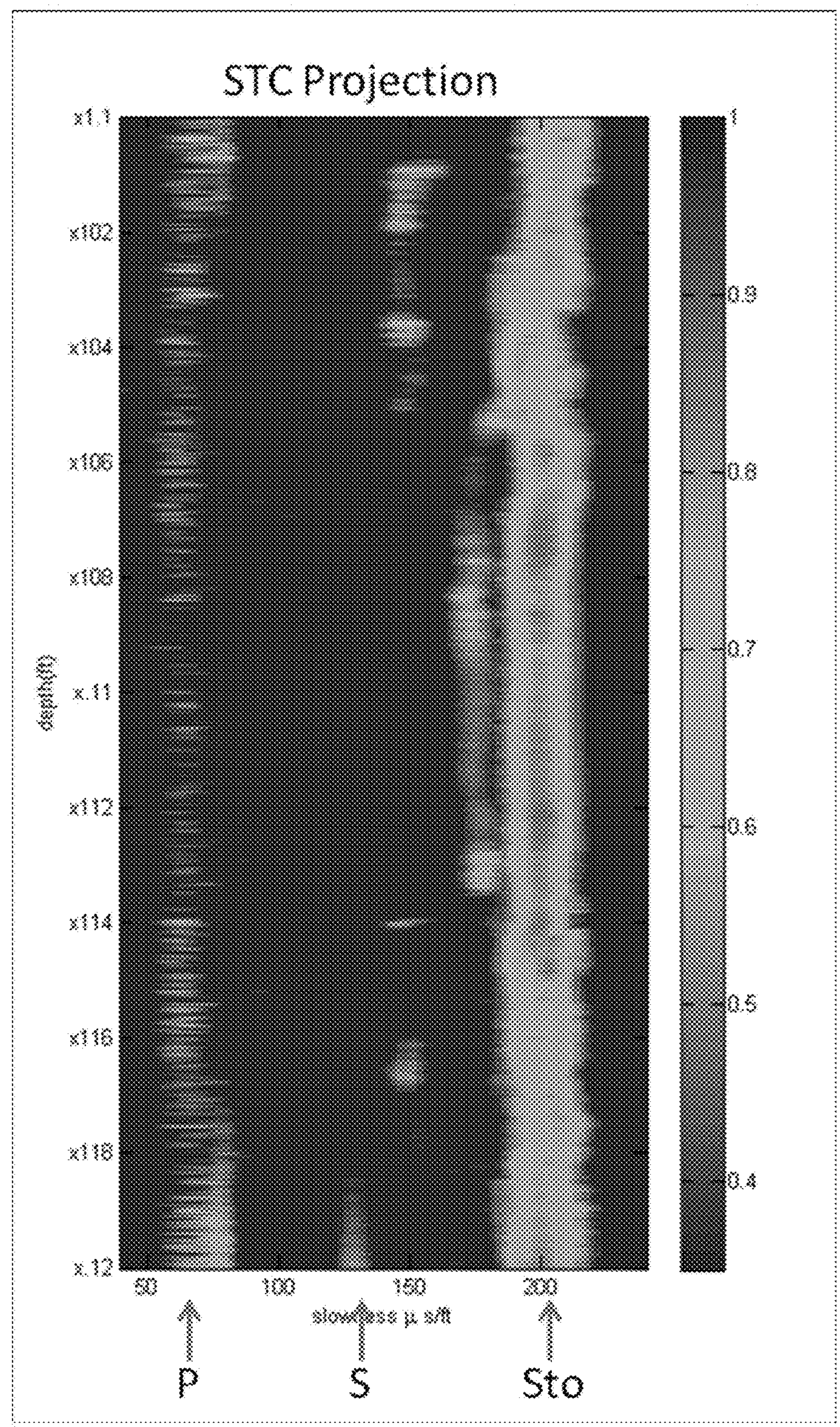
FIG. 1 is an example slowness time coherence projection plot of logging while drilling monopole Stoneley and shear data.

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Waveform data, which may be acquired from two or more receivers, may include and/or be corrupted with heavy noise and/or interferences. The examples disclosed herein relate to processing acoustic waveforms and/or waveform data by combating, identifying, filtering and/or removing additive noise and/or reflections and estimating and removing interferences to enhance weak signals in acoustic data. Specifically, the examples disclosed herein may be used to efficiently process signals in real time to enhance and/or identify weak signals of interest that may be more difficult to identify and/or drowned out by heavy propagating interferences and/or ambient noise. Thus, propagating acoustic signals can be efficiently and effectively represented and, thereafter, the data obtained can be reliably processed. The processing may occur entirely downhole, entirely uphole and/or partially uphole and partially downhole. In some examples, the examples disclosed herein are used to identify and estimate slownesses of signals (e.g., compressional signals, shear signals) obtained when logging-while-drilling (LWD) and/or using wireline sonic logging tools in an oilfield.

The examples disclosed herein may be used to identify and/or remove additive noise, reflections and/or interferences. For example, shrinkage in the Discrete Radon Transform (DRT) domain may be used to substantially remove noise and interference cancelation may be used to substantially remove interferences.

As disclosed herein, the DRT domain (e.g., Slant Stack) may be used to identify and/or remove additive noise and/or reflections. In some examples, for a given frequency band, the waveform data is used to derive conditions for a stable DRT inverse. For a stable DRT inverse, time compact non-dispersive acoustic signals may be represented using an efficient frame, which refers to a concentrated and/or sparse representation in terms of DRT coefficients while additive noise and/or reflections may have a non-sparse representation. Frames corresponding to the DRT domain may be used to efficiently represent acoustic data with non-linear moveout such as parabolic moveouts in seismic and/or borehole seismic applications.

If a stable DRT inverse exists, shrinkage may be used in the DRT domain to de-noise the data. Specifically, semblance may be used to determine data adaptive space-time shrinkage factors and/or estimators for DRT coefficients. To remove propagative interferences, positive slownesses may be used when taking the DRT and, thus, negative slownesses and/or the reflections and/or signals propagating uphole (e.g., the direction opposite that of the signal transmitted) may be removed. While the above examples describe the frame corresponding to the DRT, the results and/or coefficients determined for DRT may be used for different and/or more generalized frames such as curvelets and/or ridgelets.

To identify and/or remove propagative interferences, different approaches may be taken. For example, a slowness time mask may be applied to the forward DRT prior to taking the inverse. Such an approach is relatively effective when identifying and/or removing interferences that are separated in slowness and time, but may be less effective when two modes are relatively close in slowness and time with limited aperture arrays.

Additionally and/or alternatively, for signal representation, to identify and/or remove propagative interferences, one or more of the interferences may be estimated (e.g., robustly estimated) using a time-frequency compact space-time propagator. The estimated interferences can be subsequently subtracted from the data and/or waveform data. Specifically, time-frequency compact space-time propagators may be determined to represent and/or estimate propagative acoustic signals and/or interferences. The acoustic interference estimates may be subtracted from the data and/or waveform data. While the examples disclosed herein are discussed with reference to using space-time propagators in borehole acoustic applications, the example space-time propagators may be generally used for processing acoustic data.

The examples disclosed herein may be related to sonic processing technologies related to measurements of wave speeds and/or slownesses of compressional (P-waves) and shear (S-waves) acoustic waves in a rock sub-surface in oilfield logging. To obtain the waveform data, a tool and/or sonde is introduced into a fluid filled well in an oilfield. The tool and/or sonde includes one or more sonic transmitters and an array of two or more receivers. In operation, the one or more transmitters transmit signals and/or energy that propagates through the rock formations and/or borehole fluid and is collected by receivers at various depths along the well and/or borehole. The waveform and/or signal data collected, which may be used to produce a log, is digitized and/or processed to estimate the compressional and/or shear wave speeds in the rock at the respective depths.

In some examples, waveform data may be processed using semblance and/or slowness time coherence (STC) processing. Such processing may be used in connection with wireline tools (WL) and/or processing lower amplitude and/or non-dispersive compressional and/or shear head waves. In logging while drilling (LWD) applications, the sonde, which is incorporated into the drill string, obtains measurements during the drilling operation. In contrast to a wireline tool that operates in a relatively low noise environment, the noisy and/or high interference environment encountered when logging while drilling makes identifying the head waves using semblance and/or STC processing more difficult. Some of the noise and/or interference encountered when logging while drilling may be associated with drill noise, mud flow noise, noise from stabilizers rubbing against and/or interacting with the borehole wall and/or the Bottom Hole Assembly (BHA) banging against and/or engaging the formation. As shown in FIG. 1, because of the noise and/or interference, the waveform data and/or the processed waveform data may have low and/or no semblance. Low and/or no semblance disrupts the continuity of the log produced, especially in fast formations where the compressional wave arrival is relatively weak. FIG. 1 is an STC projection plot of LWD monopole compressional (P) and sheer (S) data that illustrates the discontinuity and drop out zones in the compressional and shear semblance images.

While data may be averaged across acquisitions and/or depth frames to improve the signal to ratio (SNR), spatial resolution of the measurements may decrease. The examples disclosed herein reduce, filter and/or identify noise and/or interference at each depth frame, thereby enhancing compressional wave semblance and/or shear wave semblance and substantially reducing drop-out zones (e.g., low or no semblance) without any loss of spatial resolution.

In some examples, Equation 1 may be used as a simplified signal model for monopole compressional wave and/or shear wave acquisition in a fluid filled borehole for non-dispersive signal propagation across a sonic array borehole tool. Referring to Equation 1, $s_{sh}(t)$ corresponds to the shear arrivals, $s_{st}(t)$ corresponds to Stoneley arrivals, $z_l$ corresponds to the location of the $l^{th}$ receiver and $s_c(t)$ corresponds to the temporal waveform at the first receiver corresponding to the compressional head wave at the arrival time, $\tau_c$. In some examples, $s_{sh}$, $s_c$, and $s_{st}$ may be time compact. In some examples, $w_l(t)$ models the additive receiver noise and interference processes at receiver, l. In the model of Equation 1, it may be assumed that the amplitude variation across the array due to geometric spreading and attenuation is negligible for the head waves and the Stoneley wave may be ignored. Additionally, it may be assumed that dispersion (wavespeed dependence on frequency), if present, is relatively small and may be ignored. Thus, the monopole signal may be modeled as a superposition of non-dispersive propagating time compact waveforms.

$$yl(t)=s_c(t-p_c(z_l-z_1)-\tau_c)+s_{sh}(t-p_{sh}(t-p_{sh}(zl-z1)-\tau_{sh})+s_{st}(t-p_{st}(z_l-z_1)-\tau_{st})+w_l(t) \quad \text{Equation 1}$$

Equation 2 represents an equivalent frequency-wavenumber (f–k) domain model, where the wavenumber is defined as k=fp, the Fourier transform of the respective time domain signals corresponds to $S_c(f)$,$S_{sh}(f)$,$S_{st}(f)$ and $W_l(f)$ corresponds to the Fourier transform of the noise. In the model of Equation 2, it may be assumed that attenuation is negligible and may be ignored and that the Stoneley, while strictly dispersive, is almost non-dispersive in the frequency band of interest, 10-16 kilo Hertz (kHz).

$$Y_l(f)=S_c(f)e^{-i2\pi p_c f(z_l-z_1)}+S_{sh}(f)e^{-i2\pi p_{sh} f(z_l-z_1)}+S_{st}(f)e^{-i2\pi p_{st} f(z_l-z_1)}+W_l(f) \quad \text{Equation 2}$$

Figures 2A, 2B, 2C, 2D:
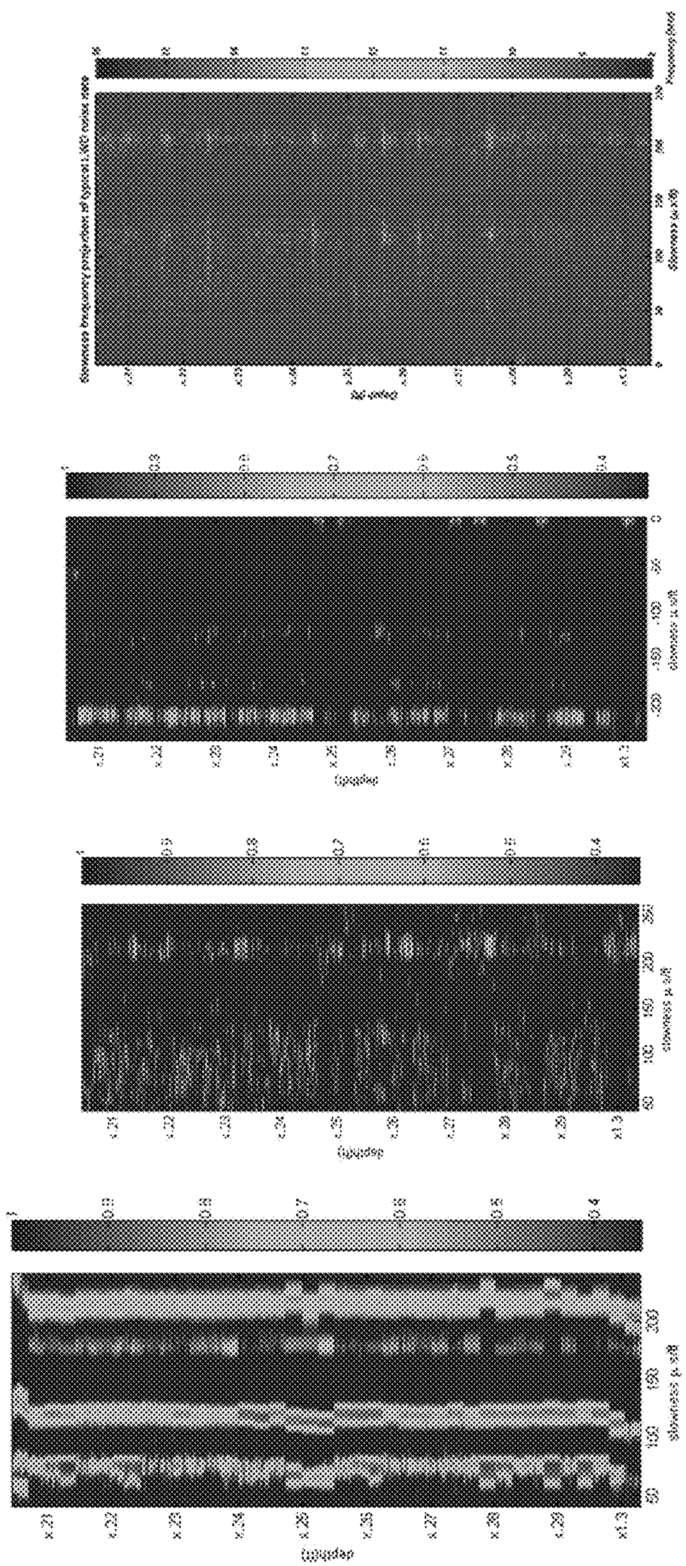
FIGS. 2*a*-2*d* show characteristics of logging while drilling monopole noise.

In the LWD environment, there is a relatively strong persistent background noise that includes random noise and a modal content that is similar to that generated by a monopole transmitter excitation. However, unlike the transmitter excitation, there is no time compactness due to the persistency of the LWD noise source excitation itself. The modal content of LWD noise may be referred to as LWD systematic interference. Additionally, reflections may be present that have similar modal content with back propagating waves. As with monopole excitation, LWD interference may be dominated by the Stoneley type mode. Stoneley interference energy may be at low frequencies and the Stoneley interference may be filtered using a bandpass frequency filter covering the processing band of [10-16] kHz or [8-14] kHz chosen for monopole LWD logging, for example. However, even after filtering as shown in FIG. 2*d*, residual interference in the processing band may be large relative to the compressional interference. FIG. 2*d* contains a slowness-frequency (SFA) projection plot constructed by projecting the slowness estimates at various frequencies and illustrates substantial propagating noise energy in the 8-16 kHz frequency band of interest. The slownesses may be obtained by the matrix pencil method on a depth log. FIG. 2*d* illustrates the Stoneley type interference and the shear type interference that impacts the weak compressional signal in fast formations. Thus, the interference model includes energy propagating at both Stoneley and shear wavespeeds.

FIGS. 2*a-d* show the propagating components of the noise process where the STC projection plot of the monopole data has been compared with the STC projection plots on noise acquisitions for the same section of the well. FIG. 2*a* is an STC projection plot of a monopole firing that illustrates the monopole content at each depth in which the compressional is approximately 70-80 μs/ft, the shear is approximately 120-130 μs/ft and Stoneley is approximately 220 μs/ft. FIG. 2*b* is an STC projection plot of pure noise acquisitions at the depths of FIG. 2*a* that illustrates the dominating Stoneley and shear type interfaces. FIG. 2*c* is an STC projection plot that focuses on back propagating waves and/or negative slowness. In some examples, the back propagating waves include Stoneley and shear-like propagating components. FIG. 2*d* is a slowness frequency projection (SFA) versus depth with frequency and energy that illustrates that substantial energy is propagating at slownesses around the shear and Stoneley in the 8-16 kHz frequency band of interest.

Equation 3 represents a simplified signal model for monopole data in the frequency wavenumber domain collected into vectors for all receivers. The vector, v, with the subscripts corresponding to the signal components includes the exponential terms of Equation 2 modeling the propagation across the array. The noise and the interference are also included with the subscript $D_+$ corresponding to the LWD forward propagating noise component of the data and $D_-$ corresponding to the LWD backwards propagating noise component of the data. Referring to Equation 3, c corresponds to the compressional component of the monopole firing data, sh corresponds to the shear component of the monopole firing data and st corresponds to the Stoneley component of the monopole firing data.

$$\underbrace{\begin{bmatrix} Y_1(f) \\ Y_2(f) \\ \vdots \\ \vdots \\ Y_L(f) \end{bmatrix}}_{Y(f)} = [v_c(f),\ v_{sh}(f),\ v_{st}(f)] \underbrace{\begin{bmatrix} S_c(f) \\ S_{sh}(f) \\ S_{st}(f) \end{bmatrix}}_{S(f)} + \underbrace{\begin{bmatrix} W_1^{add}(f) \\ W_2^{add}(f) \\ \vdots \\ \vdots \\ W_L^{add}(f) \end{bmatrix}}_{W^{add}(f)} + \underbrace{v_{D_+}(f)S_{D_+}(f) + v_{D_-}^{n}(f)S_{D_-}(f)}_{W^{sys}(f)} \quad \text{Equation 3}$$

In some examples, $V_{D_+}(f)=[(v_{st}(f)v_{sh}(f)]$ and $V_{D_-}(f)=[(v_{st}(f)v_{sh}(f)]$.

In contrast to wireline applications, in LWD applications and/or high noise situations, the systematic LWD noise, $W_{sys}$, may be present at all times and may interfere with the head waves while the $W_{add}$ component is relatively large. Also, because of the relatively small transmitter/receiver (TR) spacing (e.g., seven feet) of LWD tools, the modes may be relatively close in time and may interfere with each other, especially in, for example, a very fast formation. Because of this interference, the direct application of slowness time coherence processing may not yield accurate headwave slowness estimates and may result in lowered or missing semblance output leading to dropout zones particularly in, for example, compressional logs for fast formations.

The examples disclosed herein may reliably detect the presence of head waves and estimate the compressional slowness and shear slowness using the signal model of Equation 3 with the presence of heavy interfering noise and inter-modal temporal interference of shear arrivals with the compressional arrivals.

The examples disclosed herein may identify, filter and/or remove additive noise and reflections from LWD monopole data and/or acquisitions using space-time shrinkage coefficients in the DRT domain. For each time, the DRT may calculate and/or determine the coherent energy along moveouts (e.g., equivalent to slownesses) to provide and/or obtain a slowness-time map of the waveforms.

Equation 4 represents a continuous Radon transform of a signal, y(t,z).

$$X(\tau,p)=(Ry)(\tau,p)=\int_z y(\tau+pz,z)dz \quad \text{Equation 4}$$

Equation 5 represents the inverse Radon Transform, where K corresponds to a one dimensional convolutional operator/filter and R* corresponds to the dual (adjoint) transform of R.

$$R^*KR=I \quad \text{Equation 5}$$

Given the relationship of Equation 5, the original transform may be determined using Equation 6 and the convolutional operator, K, may be defined by Equation 7.

$$y=R^*KX \quad \text{Equation 6}$$

$$KX=\int_{-\infty}^{\infty}|f|X(f,p)e^{-i2\pi f}df \quad \text{Equation 7}$$

Equation 8 represents the Fourier transform of the Radon transform.

$$X(f,p)=\int X(\tau,p)e^{i2\pi f\tau}d\tau \quad \text{Equation 8}$$

Equation 9 may be used to infer the discrete version of the forward Radon transform with uniform sampling in space, where $\delta_l = z_l - z_{l-1}$ is the inter-receiver spacing.

$$R_d(\tau,p) = \Sigma_{z_l} y(\tau + pz_l, zl)\delta_l \quad \text{Equation 9}$$

In some examples, a straightforward discretization of the inverse formula (Equation 9) is not suitable for discrete applications particularly when, for example, there are a finite number, L, of receivers. However, in some examples, the algebraic inverse may be stable under certain conditions and a discrete set of J moveouts $p \in \{p_0, p_0+\Delta p, \ldots, p_0+(J-1)\Delta p\}$ may be selected. Equation 10 may be used to express the forward DRT in the frequency domain in terms of the parameters L,f,δ,Δp. Referring to Equation 10, P is the vector of slowness values, $z=\delta[0, 1, \ldots, L-1]^T$ is the array location vector taking the first receiver as the reference (origin) and $Y(f,z) \in \mathbb{C}^{L\times 1}$ is the DFT of the array data at frequency, f.

$$\begin{bmatrix} X(f, p_0) \\ X(f, p_0 + \Delta p) \\ \vdots \\ X(f, (J-1)\Delta p) \end{bmatrix} = X(f, P) = e^{i2\pi fP * z'} \begin{bmatrix} Y(f, 0) \\ Y(f, \delta) \\ \vdots \\ Y(f, (L-1)\delta) \end{bmatrix} = R(f)Y(f, z) \quad \text{Equation 10}$$

Equation 11 shows the pseudoinverse of R(f) at f and describes the inverse DRT at frequency, f, where it is assumed that $(R^*(f)R(f))^{-1}$ is invertible and J>L. In some examples, to obtain the inverse transform for a given frequency band, the algebraic inverse operation is applied to each frequency and the inverse Radon transform (IRT) is determined by taking the inverse DRT of the resulting data in the frequency domain.

$$R^{\dagger} = (R^*(f)R(f))^{-1}R^*(f) \quad \text{Equation 9}$$

The properties of the inverse may be analyzed and/or processed in relation to the stability of the inverse. Without loss of generality and to avoid carrying an extra phase factor in the calculations, the reference receiver selected is in the center of the array so that the receiver index takes values $$l \in \left\{-\frac{L-1}{2}, \ldots, \frac{L-1}{2}\right\},$$

the reference slowness for the Radon transform, $p_0$, is considered to be the average of the slowness range and the slowness index is described as $$j \in \left\{-\frac{J-1}{2}, \ldots, \frac{J-1}{2}\right\}.$$

For borehole sonic tools, in some examples, the range of slowness values for computing the DRT is larger than the number of receivers, J>>L. In some such examples, the inversion procedure using $(R^*(f)R(f))^{-1}R^*(f)$ is defined computationally as the rank of the matrix R(f) is L<<J. In some examples, the inversion procedure using $(R^*(f)R(f))^{-1}R^*(f)$ may enable the eigen value properties of the matrix, R*(f)R(f), to be relatively easily analyzed. For a given frequency, f, and a fixed range of slownesses, L, the stability of the inverse may be related to the range or span of the normalized wavenumber at frequency, f.

For each frequency, f, the matrix, R*(f)R(f), can be shown to have a stable inverse if a normalized wave number range, $k_{f,norm}=(P\delta)f$, spans the entire range (0, 1] in a sufficiently dense manner. In some examples, the matrix, $R^*(f)R(f)=U_\Phi R_1 U_\Phi$, and the matrix, $R_1$, have elements given by the Dirichlet function described in Equation 12. $U_\Phi$ is a diagonal matrix and the $l^{th}$ diagonal entry is associated with the phase factor, $\exp(-2\pi\delta f p_o l)$. Referring to Equation 12, $\alpha=\Delta p\delta fJ=\text{range}(k_{f,norm})$, the wave number range with limiting values are applied when the denominator equals zero.

$$[R_1]_{l,l'} = \frac{\sin\pi\alpha(l-l')}{\sin\frac{\pi\alpha(l-l')}{J}} \quad \text{Equation 12}$$

Because the diagonal matrices are unitary, the condition number of R*(f)R(f) is same as that of $R_1$. In some examples, when J≥L, the matrix is J multiplied by the identity when α=1, and, thus, has a condition number equal to 1. Because α represents the span of the normalized wave numbers corresponding to P, this implies that the Radon transform inverse in frequency is optimally conditioned when the wave numbers corresponding to P are uniformly sampled over the entire normalized interval, (0, 1] with J>L. However, because the Radon transform naturally operates in the time-slowness domain, the Radon transform involves an operation over multiple frequencies and α is a function of frequency, and will not generally equal one in the inverse operation.

Figure 3:
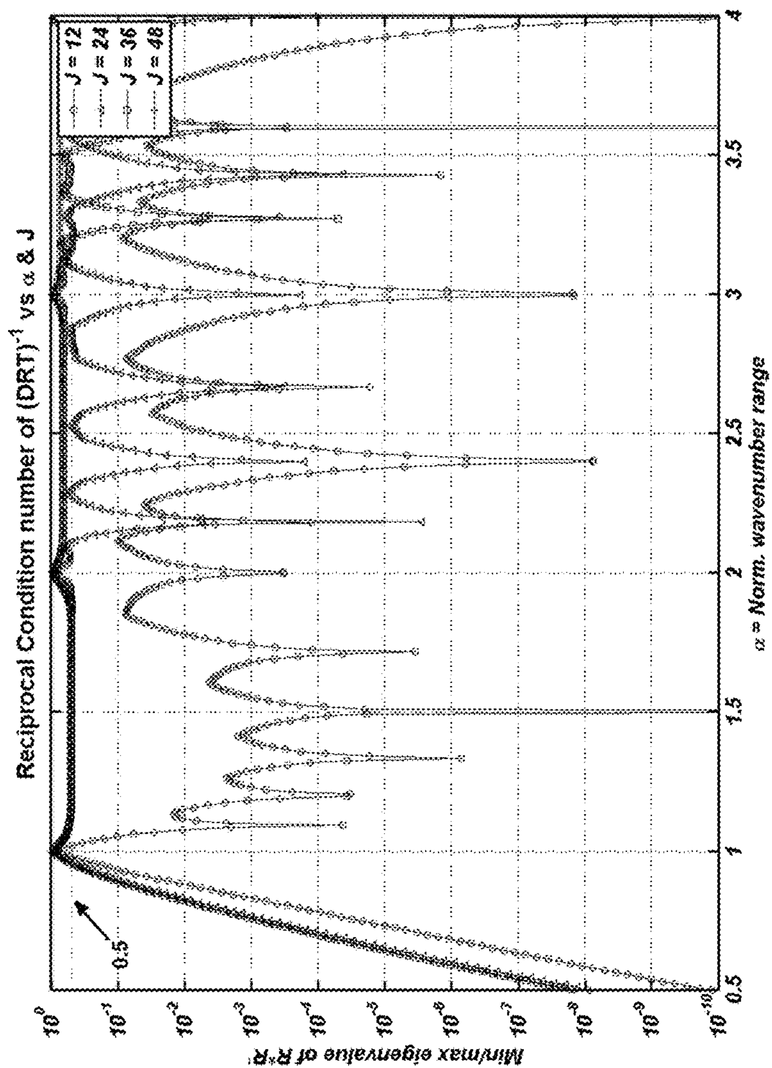
FIG. 3 is a graph illustrating a reciprocal condition of the inverse Radon kernel as a function of the wavenumber range and the number of slownesses.

Equation 13 may be used to approximate Equation 12 in the limit of a large number of slownesses, J. In some examples, the condition number improves to 1 as α→1. Additionally, the condition number may remain bounded for sufficiently large slownesses, J, for α>1 when the wave number range, α, aliases back into the [0,1) range and continues to obtain sufficiently dense, but non-uniform samples. Therefore, it may be sufficient to have a dense sampling of the entire wave number interval for a stable inverse. Equation 13 was developed by a numerical study of the condition number, $R_1$, as a function of α for a number of values of J. In some examples and as shown in FIG. 3, the results of the reciprocal condition number were plotted for L=12. FIG. 3 illustrates the reciprocal condition number of the inverse Radon kernel, R(f)*R(F) as a function of the wavenumber range, α, for given values of the number of slowness values chosen, J. As shown in FIG. 3, the condition number improves dramatically as α approaches 1 and stays bounded below 2 for a range of α around 1 depending on the choice of J. In this example, the condition number is bounded below 2 whenever J is greater than a number depending on the range of alpha, α.

$$[R_1]_{l,l'} \xrightarrow[J\,large]{} \frac{J}{\alpha}\frac{J\sin\pi\alpha(l-l')}{\pi(l-l')} \quad \text{Equation 13}$$

In some examples, a DRT may be constructed with a stable inverse on a particular frequency band in which the range of slownesses is chosen to correspond to a value of α for a minimum frequency that is greater than or equal to 1 and the number of slownesses, J, may be chosen to be sufficiently large so that the condition stays bounded for the resulting range of α over the processing band. In some examples, the number of slownesses, J, equals 48 and the inverse stays stable for values of α between 1 and 4, which covers most practical cases of the processing band.

In some examples, LWD data includes reflections due to discontinuities on the bottom hole assembly (BHA) and formation (e.g., bedding, fractures, etc.) and additive noise due to mud flow. The examples disclosed herein identify, filter and/or remove such interference, reflections and/or noise elements.

In some examples, for a vector space S equipped with an inner product <., .>, a countable family of basis elements, $\Phi=\{\phi_i\}_{i\in I}$, where I is an index set is called a frame for S if, for all signals, s∈S, there are positive constants a and b as shown in Equation 14.

$$\alpha\|s\|^2\leq\Sigma_{i\in I}\|{>}\phi_i,s{>}\|^2\leq b\|s\|^2 \quad \text{Equation 14}$$

A frame may be referred to as a tight frame if a=b=1. In some examples, ΦΦ*=I. To obtain a desirable and/or good frame, the frame coefficients may be close to one another and/or bouded, α≈b>0 to enable the preservation of $l_2$ isometry and/or energy similar to Parseval's relationship for Fourier transform. In some examples, a frame may be referred to as an efficient frame to represent a signal, S, if the coefficient sequence, Φ*S, is sparse and/or the signal, S, is compactly represented in the frame coefficients.

If the transformation associated with Φ* has a stable inverse then the problem of signal de-noising can be equivalently treated in the transform domain. For example, in the transform domain, if the signal representation is compact while the noise spreads out, a thresholding operation may be used to remove some and/or most of the noise. Some thresholding operations include hard thresholding and/or soft thresholding. Soft thresholding may be referred to as shrinkage because it shifts the signal magnitude towards zero. In such examples, knowledge and/or information regarding noise variance may be used. Noise variance information available when performing LWD sonic applications may be used in shrinkage operations to de-noise the data. For example, linear shrinkage factors may be approximated using data semblance.

Signal de-noising may be performed by assuming that the DRT forms an efficient frame to represent non-dispersive time-compact acoustic signals from the monopole firing. In the DRT, shrinkage factors and then an inverse DRT operation are used to obtain a de-noised signal. In some examples, an optimal shrinkage factor may be determined using a semblance map of the data.

The DRT may be used to efficiently represent the data. In some examples, the collection of basis elements provides an efficient representation of a signal class if (a) the transformation is energy preserving (e.g., the collection of the basis forms a tight frame) and (b) the signals are compactly represented in the transformed domain (e.g., the signal has sparse support on the basis elements).

Equation 15 represents a modified Parseval type relationship between the data, S, and the DRT, X, for a time sampled system with a finite number of frequencies $f_1, \ldots, f_{N_f}$ in a band, F. Equations 16, 17 and 18 describe the variables of Equation 15, which may be obtained by concatenating the component vectors.

$$\|X_F(P)\| = \|K_F^{1/2} S_F(z)\| \quad \text{Equation 15}$$

$$X_F(P) = \begin{bmatrix} X(f_1, P) \\ X(f_2, P) \\ \vdots \\ X(f_{N_f}, P) \end{bmatrix} \quad \text{Equation 16}$$

$$S_F(z) = \begin{bmatrix} S(f_1, z) \\ S(f_2, z) \\ \vdots \\ S(f_{N_f}, z) \end{bmatrix} \quad \text{Equation 17}$$

Equation 18

$$K_p = (R^* R)^{-1} = \begin{bmatrix} (R^*(f^1)R(f_1))^{-1} & 0 & \ldots & 0 \\ 0 & (R^*(f_2)R(f_2))^{-1} & \ldots & 0 \\ \vdots & 0 & \ddots & 0 \\ 0 & \ldots & \ldots & (R^*(f_{N_f})R(f_{N_f}))^{-1} \end{bmatrix}$$

In some examples, if the eigenvalues of the matrix, R, are well behaved, the DRT basis forms a good frame for acoustic signal representation having frame coefficients not far from unity. In some examples, under time compactness and a limited number of modes, the DRT frames provide a compact presentation of a signal in that the number of substantial DRT coefficients are small relative to the number of basis elements.

The DRT may be used as an efficient frame for LWD sonic data because in a particular band for a first order approximation, the modes of interest have linear moveout. If the modes of interest have moveouts along smooth curves (e.g., parabolic moveouts), then a tight and efficient frame may be constructed representing the data using, for example, a curvelet transform and/or frame. In such a multi-scale representation, at any frequency scale, for the corresponding effective frequency band at that scale, conditions for invertibility and stability of the inverse transform may be derived in a similar manner as disclosed with regards to DRT in a given band. Therefore, the examples disclosed herein relate to de-noising in a transform domain (e.g., frame).

The examples disclosed herein may be used for de-noising acoustic LWD data in the DRT domain using shrinkage. Equation 19 represents a transform, Y, of noisy data, S+W, where X=Φ*S, N=Φ*W, are coefficients of the signal, S, and noise, W, and where W is distributed according to the normal distribution, $N(0,\sigma^2 I)$. If the transformation, Φ*, is invertible and the coefficients, X, in the transform domain can be reliably estimated, then the signal, S, in the original domain may be reliably estimated by taking the inverse transform of the de-noised coefficients. In the transform domain, the noise is distributed as $N\sim N(0,\sigma^2\Phi^*\Phi)$.

$$Y=\Phi^*(S+W)=X+N \quad \text{Equation 19}$$

In some examples, the DRT coefficients, Y(t,p), for the signal, S, may be considered as a function of the slowness, p, and the time, t. In the DRT domain, the examples disclosed herein reliably estimate the true coefficients, X(t,p) followed by an inverse DRT operation to de-noise the signal.

In some examples, for each slowness, p, the class of linear estimators of the following form are considered, $\hat{X}(t,p)=q_p\cdot Y(t,p),\forall t\in T$, where T corresponds to the time support of the signal, and, $q_p$, is called a shrinkage estimator. Equation 20 represents an optimization problem that can be solved at slowness, p, where $X(p)=[X(t_1,p), X(t_2,p), \ldots X(t_N)]^T$ represents the vector of the true DRT coefficients in the time support, Y(p) represents the corresponding noisy observation vector and $\Sigma_{\tau,p}$ represents the noise covariance matrix.

Equation 20 may be used to solve for the shrinkage factor, $q_p$, which results in Equation 21, where W represents whitened noise with unit variance.

$$\min_{q_p} E(X(p)-q_pY(p))*\Sigma_{\tau,p}^{-1}(X(p)-q_pY(p)) \quad \text{Equation 20}$$

$$q_p=\frac{x*(p)\Sigma_{\tau,p}^{-1}X(p)}{X*(p)\Sigma_{\tau,p}^{-1}X(p)+E(W*W)} \quad \text{Equation 21}$$

Under the conditions of equation 12, the quantity $\Phi^*\Phi$ may be diagonally dominant and close to the identity. With some loss of generality, it may be assumed that the covariance $\Sigma\tau,p=\sigma^2 I$. In some examples, a data adaptive shrinkage estimator for a single mode based on semblance may be close to the linear estimator derived above at approximately the true slowness of the mode.

Equation 22 represents semblance in the time domain.

$$\rho(t,T_w,p)=\frac{\frac{1}{L}(\Sigma_{t_i\in[t,t+T_w]}\|\Sigma_l S_l(t_i+p\delta(l-1))+n_l(t_i+p\delta(l-1))\|^2}{\Sigma_t^{t+T_2}\Sigma_l\|S_l(t_i+p\delta(l-1))\|^2+\|n_l(t_i+p\delta(l-1))\|^2} \quad \text{Equation 22}$$

Equation 23 represents the normalized noiseless DRT coefficient (not time windowed) at time, $t_i$, which is related to the numerator in the semblance. In some examples, the coherent energy in the semblance is obtained by collecting the energy of the DRT output at a given slant, p, in a time window of length, $T_w$. In some examples, without loss of generality, it may be assumed that the true slowness, p=0, and the signal, $S_l(t_i)=S_0(t_i),\forall l$, represents a non-dispersive, non-attenuating waveform and that the signal support is bounded and shorter than $T_w$.

$$X(t_i,p)=\frac{1}{\sqrt{L}}\Sigma_l S_l(t_i+p\delta(l-1)) \quad \text{Equation 23}$$

Equation 24 represents Equation 22 after taking the expected value of the numerator and the denominator.

$$\rho(t,T_w,p)=\frac{\frac{1}{L}(\Sigma_{t_i\in[t,t+T_w]}\|\Sigma_l S_0(t_i+p\delta(l-1))\|^2+\sigma^2}{\Sigma_{t_i\in[t,t+T_w]}\Sigma_l\|S_0(t+p\delta(l-1))\|^2+L\sigma^2} \quad \text{Equation 24}$$

Equation 25 represents the shrinkage weight with the DRT being assumed to be a tight frame for the coefficients, $X(t_i,p),t_i\in\tau$.

$$q_p=\frac{\Sigma_{t_i\in\tau}\|X(t_i,p)\|^2}{\Sigma_{t_i\in\tau}(\|X(t_i,p)\|^2+\sigma^2)} \quad \text{Equation 25}$$

Under the assumed signal model, the Radon transform, $X(t_i, p)$, may be written as Equation 26.

$$X(t_i,p)=\frac{1}{\sqrt{L}}\Sigma_l s_0(t_i+p\delta(l-1)) \quad \text{Equation 26}$$

Equation 24 can be rewritten as Equation 27.

$$\rho(t,T_w,p)\approx\frac{\Sigma_{t_i\in[t,t+T_w]}\|X(t_i,p)\|^2+\sigma^2}{\Sigma_{t_i\in[t,t+T_w]}\Sigma_l\|S_0(t+p\delta(l-1))\|^2+L\sigma^2} \quad \text{Equation 27}$$

In some examples, without loss of generality, it may be assumed that $\tau\subseteq(t,t+T_w)$. Equations 28 and 29 represent the semblance and shrinkage factor respectively for a single mode case at the slowness, p=0.

$$\rho(t,T_w,0)\approx\frac{\Sigma_{t_i\in[t,t+T_w]}\frac{1}{L}\|Ls_0(t_i)\|^2+\sigma^2}{\Sigma_{t_i\in[t,t+T_w]}L\|s_0(t_i)\|^2+L\sigma^2} \quad \text{Equation 28}$$

$$q_p\approx\frac{\Sigma_{t_i\in\tau}\frac{1}{L}\|Ls_0(t_i)\|^2}{\Sigma_{t_i\in\tau}\left(\frac{1}{L}L\|Ls_0(t_i)\|^2+\sigma^2\right)} \quad \text{Equation 29}$$

In some examples, a particular slowness (e.g., the slowness) may be used with the transform represented in Equation 30 to obtain the shrinkage factor for DRT coefficients at that slowness.

$$q(L,\rho)=\max\left\{\rho,\frac{L-1/\rho}{L-1}\right\} \quad \text{Equation 30}$$

In some examples, for the other slownesses, the difference in the denominator and numerator terms in the semblance, $T_p$, and $C_p$, respectively are considered. $T_p$, as shown in Equation 31, represents the total energy in the signal without noise and interference and $C_p$, as shown in Equation 32, represents the coherent energy in the signal without noise and interference.

$$T_p=\Sigma_{t_i\in[t,t+T_w]}\|\Sigma_l S_0(t_i+p\delta(l-1))\|^2 \quad \text{Equation 31}$$

$$C_p=\Sigma_{t_i\in[t,t+T_w]}\frac{1}{L}\|\Sigma_{ls_0}(t_i+p\delta(l-1))\|^2 \quad \text{Equation 32}$$

In some examples, for a signal that is constant over a time support that satisfies for all l and p substantially close to $p=0,\tau_l\subset(t+p(l-1)\delta,t+p(l-1)\delta T_w$, the two factors, $T_p$ and $C_p$, are the same. Thus, the same transformation may be applied to obtain shrinkage coefficients (e.g., correct shrinkage coefficients) for each move-out, p. However, if the two factors, are not the same, then the same transformation may not be applied to obtain the shrinkage coefficient (e.g., correct shrinkage coefficients) for each move-out.

In some examples, the shrinkage factor (e.g., the correct shrinkage factor) at a move-out difference, p, from the true move out is defined by Equation 33 where $K(p)=C_p/T_p$.

$$q(L,\rho,p)=\max\left\{\rho,\frac{L-1/\rho}{L-1/K(p)}\right\} \quad \text{Equation 33}$$

In some examples, for a simplified signal model, $S_0(t)=A(t)e^{-j2\pi f_0 t}$ where $f_0$ is a modulation frequency and A(t) is a baseband signal, K(p) may be computed (e.g., explicitly numerically computed) given A(t). A(t) may be constant over the time support as represented in Equation 34.

$$K(p)=\frac{1}{L^2}\left\|\frac{\sin\pi f_o Lp\delta}{\sin\pi f_o p\delta}\right\|^2 \qquad \text{Equation 34}$$

In some examples, the correction is determined based on knowledge of A(t) and the true slowness, which is assumed to be zero. Thus, in some examples, the modified semblance criteria and/or semblance criteria performs a minor model selection and/or slowness selection by over shrinking the coefficients at move-outs other than the true moveout. The amount of over shrinkage may depend on the mode spectrum.

Figure 4:
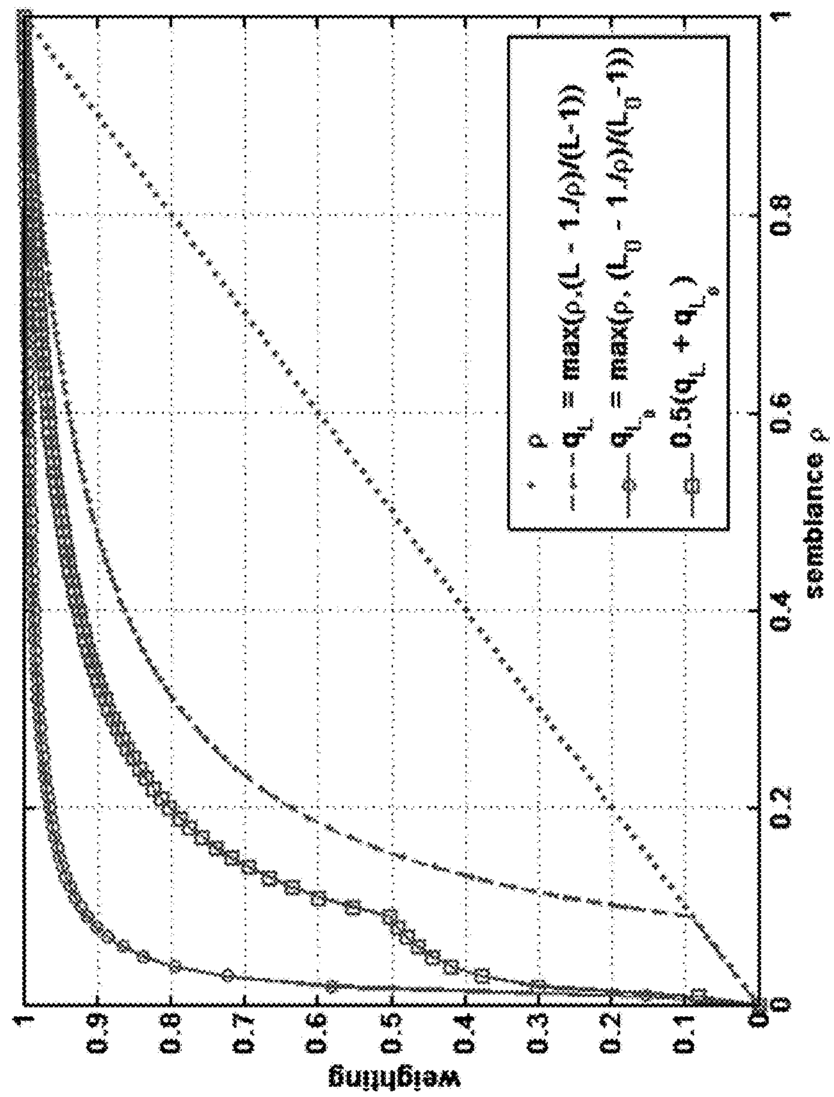
FIG. 4 is a graph illustrating shrinkage weights as a function of semblance.

FIG. 4 illustrates the shrinkage weights as a function of semblance where the number of receivers, L, is 12. While the shrinkage weights may be optimal adjacent and/or in the vicinity of the true slowness, the shrinkage weights may be sub-optimal at other slownesses. Additionally, the correction factor may not be pre-computable without prior information on the signal spectrum. Thus, the shrinkage weights may over-shrink the side lobes as compared to the main lobes and unwanted artifacts in the DRT inverse.

To substantially prevent over-shrinkage, the following weighting may be used as shown in Equation 35, where Equation 36 may be used to determine the minimal number of receivers, $L_0$, for the worst case Rayleigh resolution for band, F. Equation 37 corresponds to the normalized moveout slowness increment for the DRT and $f_{norm}$ is the normalized frequency corresponding to the minimum frequency, $f_1$, in the band, F, in which the DRT is being taken. $L_0$ is the minimal number of receivers used for the worst case Rayleigh resolution for band, F.

$$q'=0.5(q(L_0,\rho)+q(L,\rho)) \qquad \text{Equation 35}$$

$$L_0=1/(\Delta P_{norm} f_{norm}) \qquad \text{Equation 36}$$

$$\Delta P_{norm}=\Delta P\delta z/\delta t \qquad \text{Equation 37}$$

While the above example describes an approach to substantially prevent over shrinkage of the side lobes, other examples exist. For example, a more conservative weighting factor of $q(L_0,\rho)$ may be used for a large value of $L_0$. However, such a conservative weighting factor may degrade the de-noising and aggressive shrinkage may lead to unwanted artifacts in the data. The above example may be performed for a single mode or may be extended to handle time separated multiple modes.

In some examples, other shrinkage estimators based on hard and soft thresholding may be applied if the noise variance, $\sigma^2$, is known. If the noise variance, $\sigma^2$, is known, Equation 38 describes a hard thresholding operation for de-noising in the DRT domain for a single mode.

$$Y(\tau,p)=\begin{cases}Y(\tau,p) & \text{if } |Y(\tau,p)|\geq\sigma\\ 0 & \text{if } |Y(\tau,p)|\geq\sigma\end{cases} \qquad \text{Equation 38}$$

If the noise variance, $\sigma^2$, is known, Equation 39 describes a soft-thresholding (shrinkage towards zero) operation for de-noising in the DRT domain for a single mode.

$$Y(\tau,p)=\begin{cases}Y(\tau,p)-\sigma & \text{if } Y(\tau,p)\geq\sigma\\ 0 & \text{if } Y(\tau,p)<\sigma\\ Y(\tau,p)+\sigma & \text{if } Y(\tau,p)\leq-\sigma\end{cases} \qquad \text{Equation 39}$$

Estimating noise variance at each depth in a rapidly changing drilling environment is challenging for LWD sonic. The examples disclosed herein overcome this challenge by deriving shrinkage factors (e.g., near ideal shrinkage factors) using semblance of the data, which is data adaptive.

Because some downhole tools having shorter transmitter receiver spacing, the modes may not be completely time separated in a very fast formation and, thus, there is intermodal interference. In such instances, the shrinkage operation may lead to low semblance or even loss of semblance that may have initially been strong. In some examples, if a stronger mode is in the vicinity of a weaker mode, the weaker mode may undergo over shrinkage relative to the stronger mode, resulting in low semblance. To substantially prevent over shrinkage of the weaker mode, the semblance values may be observed and a shrinkage operation may not be applied if the head wave is at or above a particular strength (e.g., strong enough) by classifying the head waves in any given frame. To substantially prevent over shrinkage of the weaker mode, the noise level may be compared to the signal level, but this may be difficult to compute without prior and/or additional information.

Figure 5:
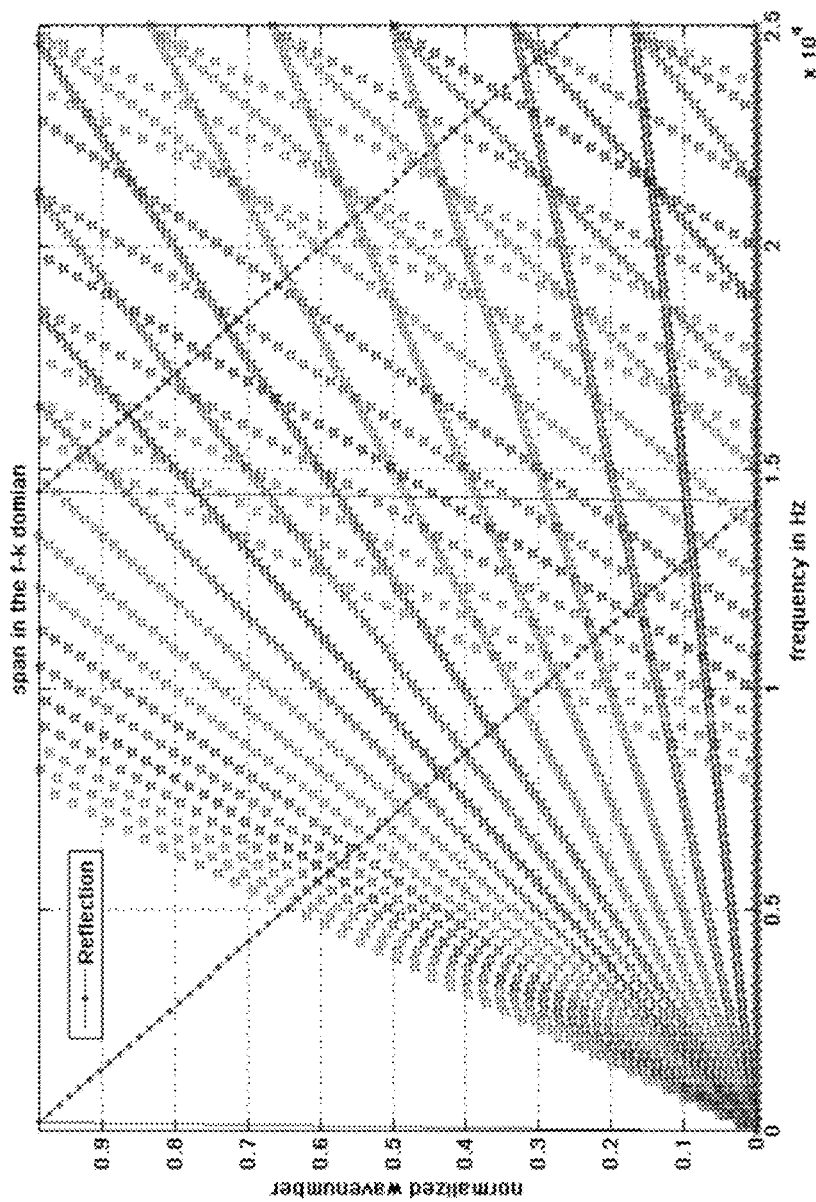
FIG. 5 is a graph illustrating the overlap of the forward Discrete Radon Transform in the frequency-wavenumber domain and a reflection in the frequency-wavenumber domain.

The examples disclosed herein may be used to identify and/or remove reflections via shrinkage. Specially, semblance based shrinkage operations suppresses the additive noise in the data and also effectively suppress reflections. FIG. 5 illustrates the overlap of the DRT basis (forward DRT) in the f-k domain and a reflection in the f-k domain. The representation of the reflection is non-sparse and, therefore, the energy is distributed out and causes shrinkage in the DRT domain to mitigate such reflections. In some examples, taking the DRT in the f-k domain includes projecting the data onto the basis formed by rays corresponding to the slownesses in the DRT. The forward DRT may be restricted to positive slownesses to enable down going waves with negative slownesses to be spread thin on the DRT basis and to be mitigated by the subsequent shrinkage operation.

Figure 6:
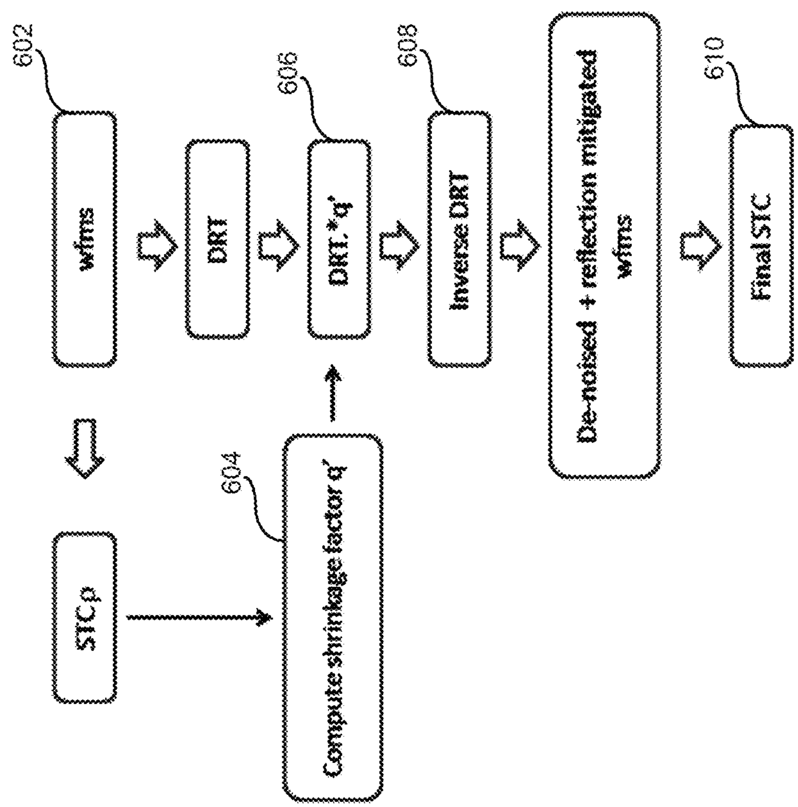
FIG. 6 is an example workflow and/or method for de-noising waveform data in the Discrete Radon Transform domain.

The examples disclosed relate to an algorithm and/or methods for STC enhancement of LWD data in the presence of additive noise and reflections. FIG. 6 represents an example method and/or flow chart for de-noising in the DRT domain. In some examples, the STC ρ of the data is used when determining the data dependent shrinkage factor. In some examples, after the inversion of the de-noised DRT coefficients, a second STC operation for enhanced semblance measurements is performed.

Referring to FIG. 6, waveform data may be obtained at block 602. One or more shrinkage factors may be determined at block 604. The shrinkage factors may be applied to the waveform data in the DRT domain at block 606. At block 608, the inverse of the DRT data may be determined (de-noised waveform data) and at block 610 a slowness time coherence plot may be produced using the de-noised waveform data.

Different methods and/or approaches may be used to remove and/or filter propagative LWD noise and/or interference. For example, slowness-time masking in the DRT domain in the context of seismic signals may be used to remove and/or identify LWD noise and/or interference. Such an approach may be implemented with the DRT shrinkage to remove and/or filter different types of LWD and/or interference. However, because of the small aperture of borehole sonic tools, this approach may not be suitable when the modes are close together in the slowness-time plane. In some instances with slowness-time masking of the main lobe of the interference, there may be substantial energy left in the side-lobes to result in only partial cancellation of the interference.

The examples disclosed herein relate to cancelling interference using space-time propagators. As compared to slowness-time masking, such an approach provides better results for dealing with inter-modal temporal interference for modes that are close to the slowness time plane. For example, the space-time propagators may be used to remove shear waves to enhance the compressional STC.

In some examples, the modes may be represented using space-time propagators. Based on the time compactness of the propagating modes, a framework may be developed to represent the acoustic data in terms of dispersive and non-dispersive space-time propagators. The framework may be relatively general and may be applied to other borehole sonic processing scenarios such as dipole data, quadrupole data and/or to analyze seismic data. However, the description herein is focused on monopole sonic data.

In some examples, to construct space-time propagators, a waveform (e.g., $\psi_\tau^{z0}(t)$), may be obtained at a reference receiver, $z_0$, with a time concentration and/or support, T, around a central time location, τ, and an effective frequency concentration and/or support, F. Equation 40 represents a propagated waveform at a receiver location, $z_1$, in which the wave number is specified as a function of frequency, k(f), τ is fixed and $\psi_\tau^{z0}(t)$ is propagated with dispersion k(f). In some examples, the frequency, k(f), may be complex for attenuative modes.

$$\phi_{zl}(t)=\int\psi_\tau^{z0}(f)e^{-j2\pi k(f)(zl-z0)}e^{j2\pi ft}df \quad \text{Equation 40}$$

Equation 41 represents a collection of propagated waveforms in which a space-time propagator having a signature waveform, ψ, central time location, τ, at a reference receiver propagating with dispersion, k(f).

$$\pi_{z0}(t,k(f))=\begin{bmatrix}\phi_{z0}(t,k(f))\\ \phi_{z1}(t,k(f))\\ \vdots\\ \phi_{zL-1}(t,k(f))\end{bmatrix} \quad \text{Equation 41}$$

Because the waveform, ψ, has an effective frequency concentration, F, the propagator in Equation 41 may be interpreted as approximating the dispersion, k(f) in band, F. However, this interpretation may not be used for non-dispersive and/or non-attenuating space-time propagators at a given slowness, p, which can be constructed using Equation 39 by enforcing $k(f)=pf, \forall f$.

Figure 7:
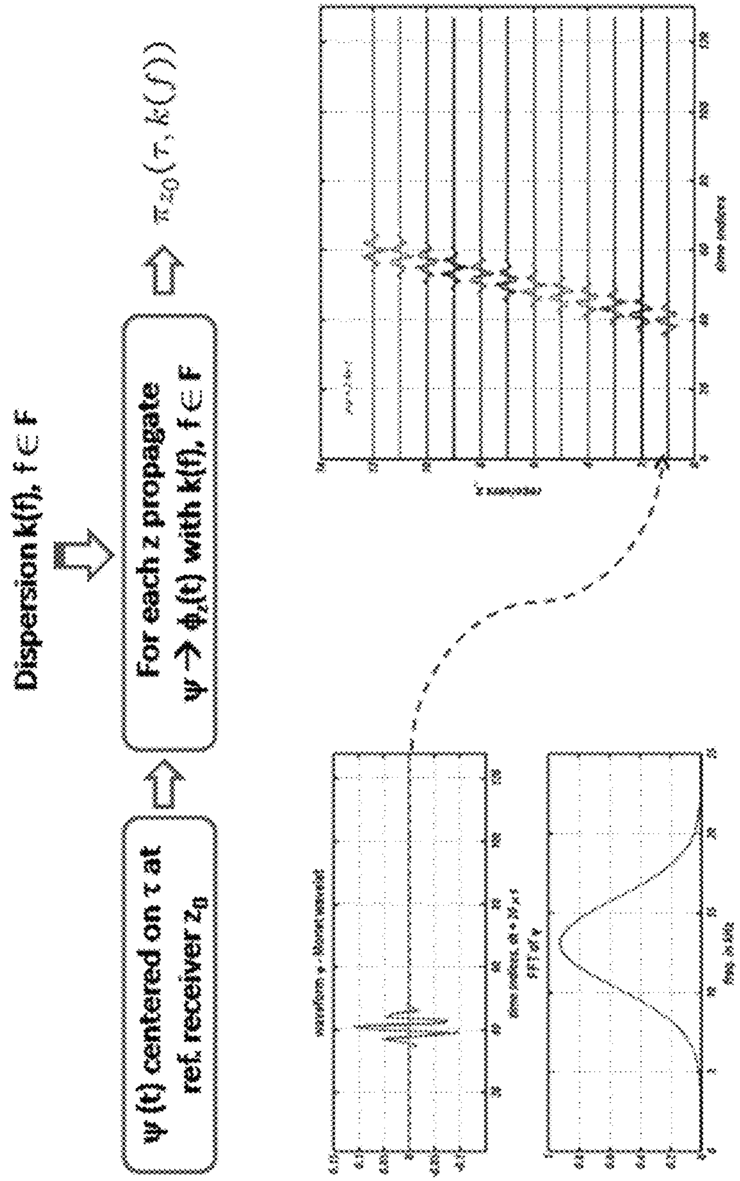
FIG. 7 illustrates a space-time propagator using a Morlet wavelet.

FIG. 7 illustrates an example space-time propagator, $\pi_{z0}(\tau,k(f))$, using a Morlet wavelet as the time-frequency compact waveform, ψ(t), at the reference receiver, l. Different time-frequency compact waveforms, ψ, may be selected. For example, for a time-sampled system, Morlet wavelets, Prolate Spheroidal Wave Functions and/or waveforms with coefficients equal to the FIR filter may be used. The FIR filter may be designed for the pass-band, F. If the data is pre-filtered using an FIR filter prior to processing, the corresponding coefficients may be used to construct the space-time propagators. In some examples, the waveform, ψ, may be optimized if spectral and time constraints are placed on the system. Equation 42 relates to the collection of π(τ,k(f)) over a given time support, τ.

$$\pi_{z0}(\tau,k(f))=\{\pi_{z0}(t,k(f))\}_{t\epsilon\tau,f\epsilon F} \quad \text{Equation 42}$$

Equation 43 represents a mode, S, with a given dispersion, k(f), in a given band, F, having a time compact representation over, τ, using space-time propagators in $\pi_{z0}(\tau,k(f))$, where $x_{\tau \ldots z_0}$ can be identified with the "mode coefficients" in a given representation at a reference receiver.

$$S=\Sigma_t\pi_{z0}(\tau,k(f))x_{t,z_0}f\epsilon F,t\epsilon\tau \quad \text{Equation 43}$$

In some examples, for a finite time sampled system, $x_{\tau,z_0,\tau\epsilon\tau}\subseteq\{1, 2, \ldots N\}$ may be obtained by solving the system equations, $\Psi x_{\tau,z_0}=s_{z0}(\tau)$ where $\Psi=[\Psi_{z_0}(\mathbf{1}),\Psi_{z_0}(\mathbf{2}), \ldots, \psi_{z_0}(N)]$ is the matrix formed of shifted versions of ψ(t) at the reference receiver. In some examples, if $S_{z_0}(t)$ is strictly time compact and ψ(t) is also strictly time compact, then the coefficients, $x_{t,z_0}$, will also be strictly time compact. In addition, if $S_{z_0}(\tau)$ is approximately time compact in that the signal envelop decays rapidly to zero around a peak value, then the coefficients, $x_{t,z_0}$ will have the substantially similar and/or the same property. In some examples, the time support, T, of the signature waveform, ψ, is different than and chosen substantially independent from the time support, τ, for the modal representation.

As disclosed herein, it may be assumed that a finite time sampled system is being used.

Interference cancellation using space-time propagators includes estimating the interfering mode and subsequently subtracting the interfering mode from the data. In some examples, it is assumed that an estimate, k(f), of the dispersion of the interfering mode in the processing band, F, is provided. For monopole firing with non-dispersive modes, $k(f)=\widehat{pf}$, where p̂ is the estimated slowness for the stronger interfering mode. Using the estimated slowness and as shown in Equation 44, an example dictionary, D, of space-time propagators, $\pi_{z_0}(\tau,p)$ for an estimated time support, τ, may be created and/or constructed for a set of moveout $p\epsilon P=\{\hat{p}-J\Delta p, \ldots, \hat{p}, \ldots, \hat{p}+J\Delta p\}$ around the estimated moveout, p̂, for a chosen value of Δp.

$$D=[\pi_{z_0}(\tau,p_1),\pi_{z_0}(\tau,p_2), \ldots, \pi_{z_0}(\tau,p_{2J+1})],p_j\epsilon P \quad \text{Equation 44}$$

Equation 45 represents a regularized solution to the system of equations that may be used to determine an estimate, $\hat{S}_I$, of the interfering mode, where the coefficient, $X\tau_P$, represents the local DRT around the slownesses and the time locations, P and τ, and W represents additive noise and interference. Using the examples disclosed, the local DRT coefficients may be reliably estimated in the presence of noise. The estimated DRT coefficients may be used to estimate and subtract out, remove, etc. the interference.

$$Y=DX_{\tau,P}+W \quad \text{Equation 45}$$

In some examples, the local DRT coefficients may be estimated using regularization methods such as Tikhonov regularization and/or Truncated Pseudo Inverse solution. Equations 46 and 47 represent processes of the Tikhonov regularization solution for an appropriate choice of the regularization, λ.

$$\hat{X}_{\tau,P}=\text{argmin}_{X_{\tau,P}}\|Y-DX_{\tau,P}\|^2+\lambda\|X_{\tau,P}\|^2 \quad \text{Equation 46}$$

$$\hat{S}_I=D\hat{X}_{\tau,P} \quad \text{Equation 47}$$

Equation 48 represents the Tikhonov regularization solution if the singular value decomposition, (SVD) of D is

[UΣV*]=SVD(D). In some examples, the computation of the right singular vectors, V, is not used and/or needed, which saves computations.

$$\hat{X}_{\tau,P}=U\Sigma(\Sigma^*\Sigma+\lambda I)^{-1}\Sigma^*UU^*Y \quad \text{Equation 48}$$

Equation 49 represents the Truncated Pseudo Inversion, where $\Sigma_T$=T(Σ,Γ), T(•,Γ) is a truncated operation that truncates the elements of the matrix to zero if the absolute value falls below, Γ, and 1 corresponds to the indicator function.

$$\hat{S}_1=U1_{\Sigma_T\neq 0}U^*Y \quad \text{Equation 49}$$

The regularization techniques disclosed above include regularization parameters. The relation between the regularization techniques may be understood in terms of the following mapping. For Tikhonov regularization, the overall operation dampens the projection on the vector, $U_i$, by a factor of, $$\frac{1}{1+\frac{\lambda}{\sigma_i^2}},$$

where the TSVD solution truncates the corresponding projection for $\sigma_i<\Gamma$ and may not otherwise dampen.

In some examples, to cancel the Stoneley and shear interfaces and improve compressional processing, two dictionaries, $D_{st}$, $D_{sh}$ are constructed around the estimated Stoneley and Shear move-outs and the time locations at which to cancel the Stoneley and shear interfaces. Equation 50 is used to form a system of equations and Equation 51 is solved for.

$$Y=[D_{st}D_{sh}]\begin{bmatrix}X_{\tau_{st},P_{st}}\\X_{\tau_{sh},P_{sh}}\end{bmatrix}+W \quad \text{Equation 50}$$

$$\hat{X}_{\tau,P}=\text{argmin}_{X_{\tau,P}}\left\|Y-[D_{st}D_{sh}]\begin{bmatrix}X_{\tau_{st},P_{st}}\\X_{\tau_{sh},P_{sh}}\end{bmatrix}\right\|^2+\lambda_1\|X_{\tau_{st},P_{st}}\|^2+\lambda_2\|X_{\tau_{sh},P_{sh}}\|^2 \quad \text{Equation 51}$$

Equations 52 and 53 are general formulas for block matrix pseudo-inverse that may be used to find the closed form solution, where $$P^{\perp}_{D_{sh,\lambda_2}}=I-D_{sh}(D^*_{sh}D_{sh}+\lambda_2 I)^{-1}D^*_{sh}$$

and where $$P^{\perp}_{D_{st,\lambda_1}}=I-D_{st}(D^*_{st}D_{st}+\lambda_1 I)^{-1}D^*_{st}$$

$$\hat{X}_{\tau_{st}P_{st}}=\left(D^*_{st}P\frac{1}{D_{sh,\lambda_2}}P^{\perp}_{D_{sh,\lambda_2}}D+\lambda_1 I\right)^{-1}D^*_{st}P\frac{1}{D_{sh,\lambda_2}}P^{\perp}_{D_{sh,\lambda_2}}Y \quad \text{Equation 52}$$

$$\hat{X}_{\tau_{sh}P_{sh}}=\left(D^*_{sh}P^{\perp}_{D_{st,\lambda_1}}D_{sh}+\lambda_2 I\right)^{-1}D^*_{sh}P^{\perp}_{D_{st,\lambda_1}}Y \quad \text{Equation 53}$$

In some examples, the estimates for the interference are given by $D_{st}X\,\tau_{stP_{st}}$ and $D_{sh}X_{\tau_{st}P_{st}}$. Using the Singular Value Decomposition (SVD), the equations may be further simplified if $[U_{st}\Sigma_{st}V_{st}]$=SVD($D_{st}$) and $[U_{sh}\Sigma_{sh}V_{sh}]$=SVD($D_{sh}$) where $$P^{\perp}_{D_{st,\lambda_1}}=U_{st}(I-\Sigma_{st}(\Sigma^*_{st}\Sigma_{st}+\lambda_1 I)^{-1}\Sigma^*_{st})U^*_{st}$$

and where $$P^{\perp}_{D_{sh,\lambda_2}}=U_{sh}(I-\Sigma_{sh}(\Sigma^*_{sh}\Sigma_{sh}+\lambda_2 I)^{-1}\Sigma^*_{sh})U^*_{sh}.$$

Equations 54 and 55 represent the estimates for the interference.

$$D_{st}\hat{X}_{\tau_{st}P_{st}}=U_{st}\Sigma_{st}\left(\Sigma^*_{st}U^*_{st}P^{\perp}_{D_{sh,\lambda_2}}U_{st}\Sigma_{st}+\lambda_1 I\right)^{-1}\Sigma^*_{st}U^*_{st}P^{\perp}_{D_{sh,\lambda_2}}Y \quad \text{Equations 54}$$

$$D_{sh}\hat{X}_{\tau_{sh}P_{sh}}=U_{sh}\Sigma_{sh}\left(\Sigma^*_{sh}U^*_{sh}P^{\perp}_{D_{st,\lambda_1}}U_{sh}\Sigma_{sh}+\lambda_2 I\right)^{-1}\Sigma^*_{sh}U^*_{sh}P^{\perp}_{D_{st,\lambda_1}}Y \quad \text{Equation 55}$$

The equations above imply that for each interference estimation, the joint solution is associated with projecting the data onto a regularized orthogonal subspace of the other component. If the dictionary, $D_{st}$, $D_{sh}$, remain the same with depth, then these quantities may be pre-computed. However, Stoneley and shear slownesses change with depth and, thus, the calculation of $D_{st}$, $D_{sh}$, is redone at each depth. If the time indices, $\tau_{st}$,$\tau_{sh}$, are the same, it is sufficient to recalculate the left singular vectors, $U_{sh}$,$U_{st}$. In some examples, the left singular vectors $U_{sh}$,$U_{st}$, may be determined with a fast unitary operation using time shifts. In some examples, the computation of the quantities including $$P^{\perp}_{D_{st,\lambda_1}},\ P^{\perp}_{D_{sh,\lambda_2}}$$

and the speed of other operations may be increased based on and/or using pre-computed SVDs. In such examples, the joint estimation may be a computational bottleneck because the inverse of $$\left(\Sigma^*_{st}S^*_{st}P^{\perp}_{D_{sh,\lambda_2}}U_{st}\Sigma_{st}+\lambda_1 I\right)$$

and $$\left(\Sigma^*_{sh}U^*_{sh}P^{\perp}_{D_{st,\lambda_1}}U_{sh}\Sigma_{sh}+\lambda_2 I\right)$$

is redetermined.

To remove and/or substantially remove the computational bottleneck of joint estimation, the examples disclosed herein use Successive Interference Cancellation (SIC) in which the Stoneley and Shear interference are successively estimated and removed. Equation 56 may be used to estimate the Stoneley interference.

$$D_{st}\hat{S}_{\tau_{st}P_{st}}=U_{st}\Sigma_{st}(\Sigma^*_{st}\Sigma_{st}+\lambda_1 I)^{-1}\Sigma^*_{st}U^*_{st}Y \quad \text{Equation 56}$$

Equation 57 may be used to estimate the Shear interference on the residual.

$$D_{sh}\hat{X}_{\tau_{sh},P_{sh}}=U_{sh}\Sigma_{sh}(\Sigma^*_{sh}\Sigma_{sh}+\lambda_2 I)^{-1}\Sigma^*_{sh}U^*_{sh}(Y-D_{st}\hat{X}_{\tau_{st},P_{st}}) \quad \text{Equation 57}$$

In some examples, the estimated Stoneley and Shear interference may be subtracted and/or removed from the data to suppress, reduce and/or filter the overall LWD interference. In some examples, the inverse of $(\Sigma^*_{st}\Sigma_{st}+\lambda_1 I)$ and $(\Sigma^*_{sh}\Sigma_{sh}+\lambda_2 I)$ may be pre-computed while the left singular vectors are obtained using a fast time shift operation. Using the SIC instead of a joint estimation and cancelation may yield acceptable solutions with reasonable computations costs.

In other examples, the Stoneley interference may be re-determined after subtracting out the shear interference (e.g., similar to Equation 57) which may be repeated to refine the estimates of the interference. In practice, this iteration may approximate the performance of the joint estimation and cancelation method with less cost.

While the examples disclosed herein discuss two interferences with respect to monopole LWD data, the example successive cancelation approach may be used with information other than borehole acoustic data when one or more interferences are present, which are representable by appropriately chosen space-time propagators. In some examples, the successive interference estimation and cancelation order is determined by the order of decreasing interference power of the interfering components.

The examples disclosed herein to estimate interference may be related to spectral regularization methods to control the effect of noise on the solution when the system is ill-conditioned. For example, instead of the Tikhonov regularization, truncated singular value decomposition TSVD regularization for successive interference cancelation may be used instead. In some examples, the dampening of the eigenvalues due to Tikhonov regularization with TSVD may be combined by dampening the small eigenvalues below the threshold. In some examples, different spectral regularization methods may be used to obtain regularized solutions for interference estimation. For example, the Regularized Total Least Squares (R-TLS) method and/or solution may be used because there is a model mismatch in terms of the accurate representation of the interference using the designed dictionary of propagators. Other model mismatch may be present because of slight dispersion in the modes. However, for reasonable choices of regularization parameters, the R-TLS solution may be the same as the Tikhonov regularization method and/or solution.

Figure 8:
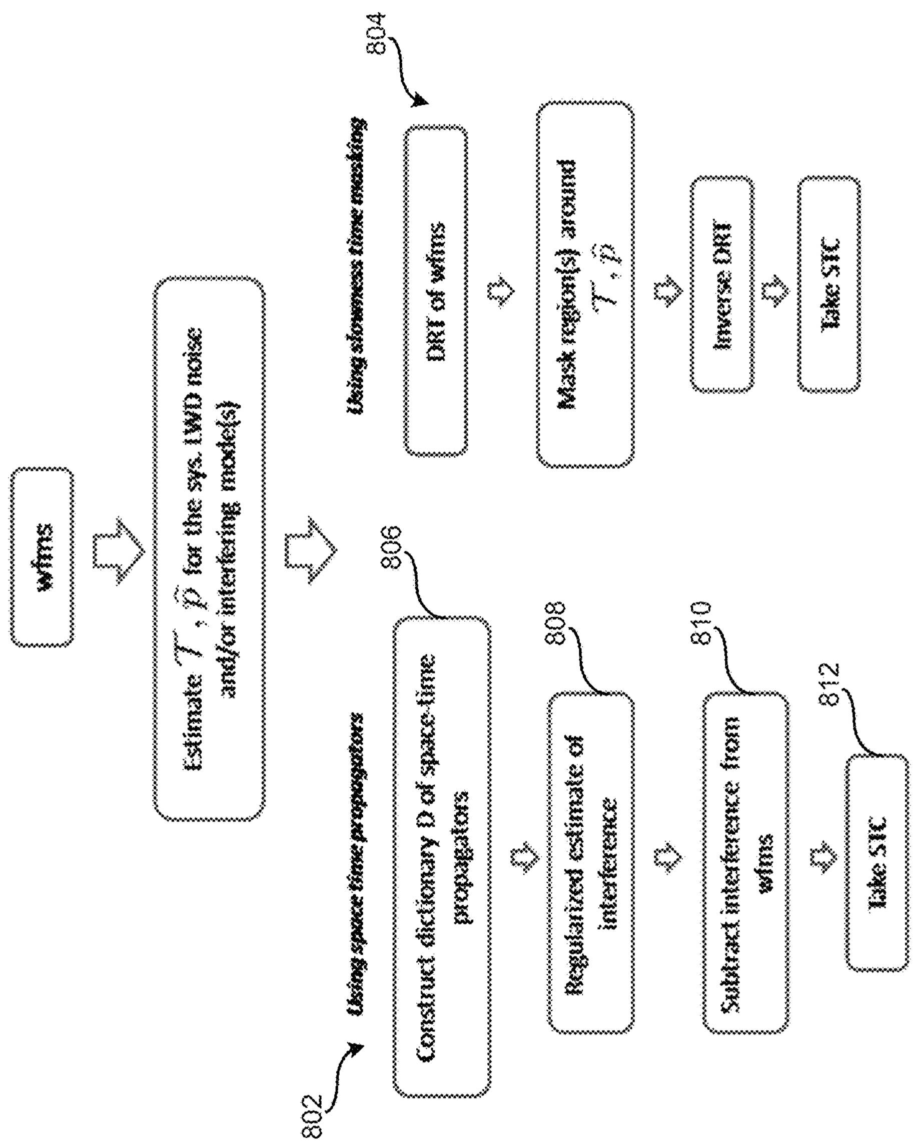
FIG. 8 is an example workflow and/or method for interference cancellation.

The examples disclosed herein may include a method and/or algorithm for cancelling propagative interference in the monopole LWD data as shown in FIG. 8. FIG. 8 includes two methods for interference cancelation. In some examples, space-time propagators may be used to estimate and cancel systematic LWD reflections that appear to propagate with Stoneley dispersion. The shrinkage based approach is effective in suppressing reflections and/or aliasing in the wavenumber and the slowness frequency domain may cause a substantial projection of the forward propagating head wave on the elements of the dictionary for reflections. Thus, to remove the reflection, substantial energy from the head waves may also be removed, which degrades the STC performance.

Referring to FIG. 8, a first approach 802 or a second approach 804 may be taken to remove interference from the waveform data. The first approach 802 relates to space-time propagators and the second approach 804 relates to slowness time masking. In the first approach 802, a dictionary of space-time propagators may be produced at block 806. Using the space-time propagators, interference may be estimated at block 808. To remove the interference from the waveform data, interference in the waveform data may be subtracted from the waveform data at block 810 and a slowness time coherence plot may be produced using the waveform data at block 812.

Figure 9:
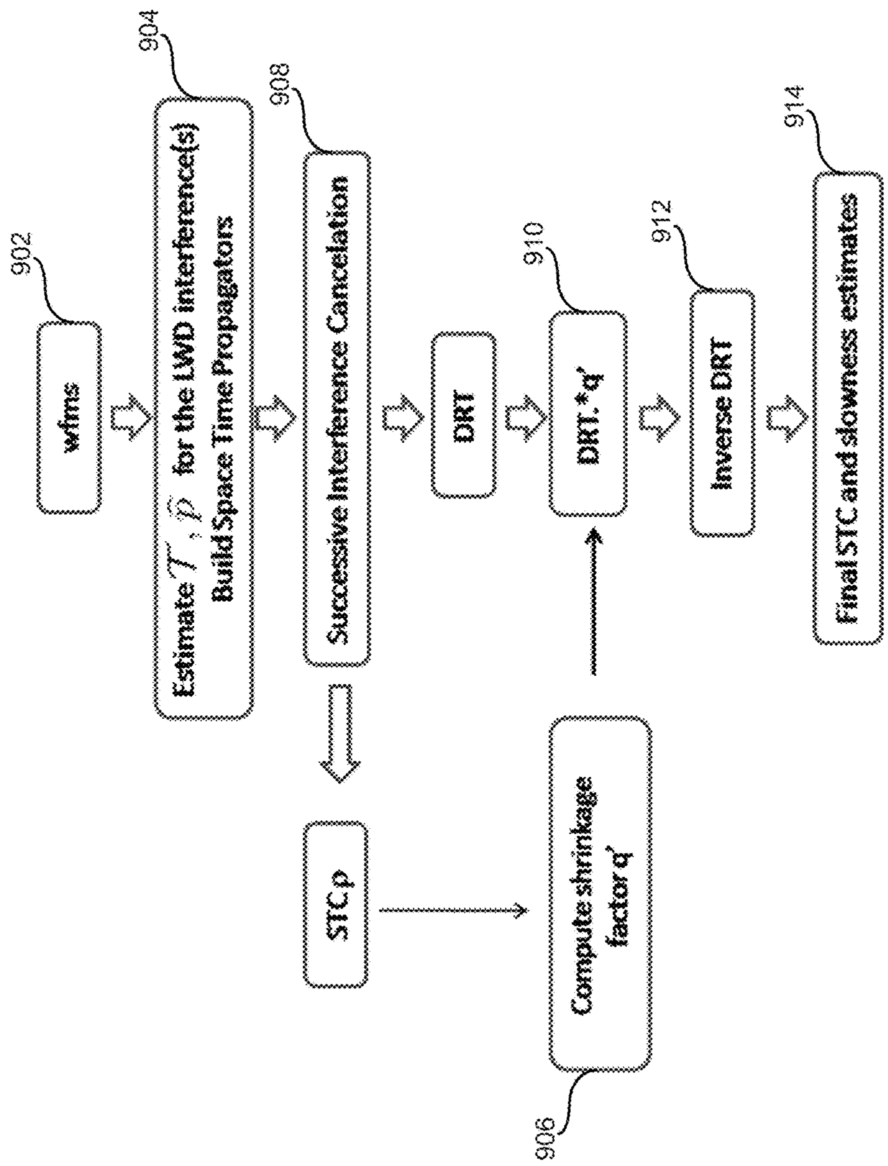
FIG. 9 is an example workflow and/or method for processing a noisy logging while drilling monopole frame.

The examples disclosed herein may be used to remove and/or filter noise and interference. FIG. 9 describes a method and/or algorithm for STC enhancement of Stoneley and shear waves in sonic logging with high noise such as LWD applications. Specifically, the processes disclosed in FIG. 9 may be used to process a frame of monopole borehole sonic data with high noise such as in a LWD application in which the shrinkage based de-noising algorithm is used in combination with the interference cancelation approach for robust headwave detection. While a slowness time masking approach may be used to cancel and/or remove Stoneley interference, in the example of FIG. 9, space-time propagators are used to remove and/or filter all and/or substantially all LWD interference. In some examples, de-noising using shrinkage factors in the DRT domain after the successive interference cancellation may be used if the additive noise and reflections are not substantial.

Referring to FIG. 9, waveform data may be obtained at block 902 and space-time propagators may be determined at block 904. One or more shrinkage factors may be determined at block 906 and estimated interference may be removed from the waveform data at block 908. The shrinkage factors may be applied to the waveform data in the DRT domain at block 910. At block 912, the inverse of the DRT data may be determined and at block 914 a slowness time coherence plot may be produced using the de-noised waveform data.

Figures 10A, 10B:
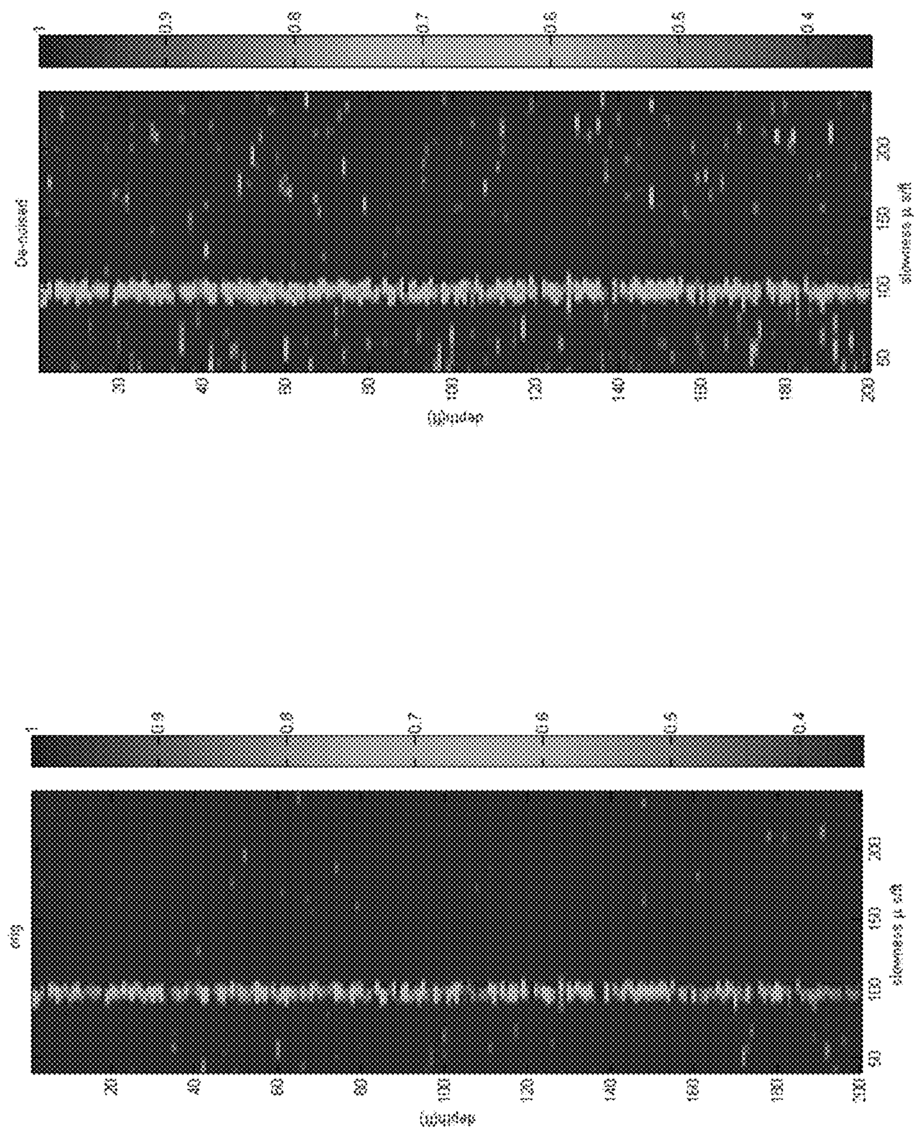
FIGS. 10*a*-10*b* compare slowness time coherence projections before and after de-noising using the examples disclosed herein.
Figure 11:
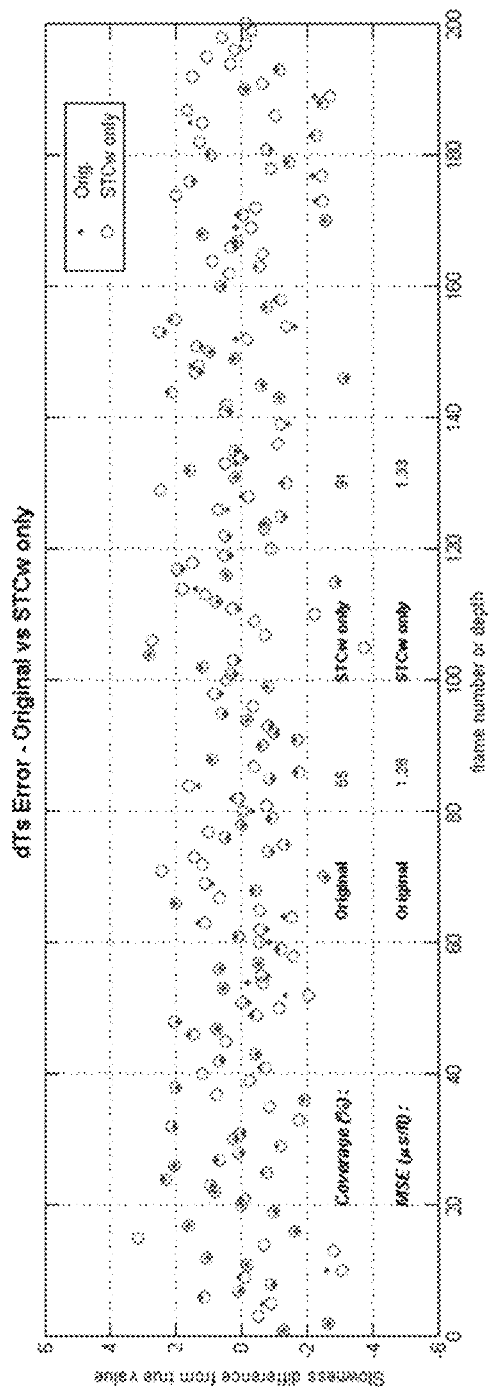
FIG. 11 illustrates errors in slowness estimation for the data of FIGS. 10*a* and 10*b*.

Synthetic data was used to validate the examples disclosed herein. For example, the shrinkage based de-noising approach in the DRT domain was tested using a synthetic data set including one propagating mode. 200 frames were generated with an average slowness of approximately 95 μs/ft and added noise and reflections to simulate the noise level in a typical LWD environment. FIGS. 10 and 11 depict the results and/or improvements in semblance and log coverage after de-noising using the examples disclosed herein. Specifically, FIG. 10*a* depicts the STC projection plot before de-noising and FIG. 10*b* depicts the STC plot after de-noising. FIG. 11 depicts the error in slowness estimation for the data of FIG. 10. As illustrated in FIG. 11, the variance of slowness estimate increased slightly from 1.2822 μs/ft to 1.33 μs/ft and the detection power and/or coverage improved from 65% to 91%.

Figures 12A, 12B, 12C, 12D:
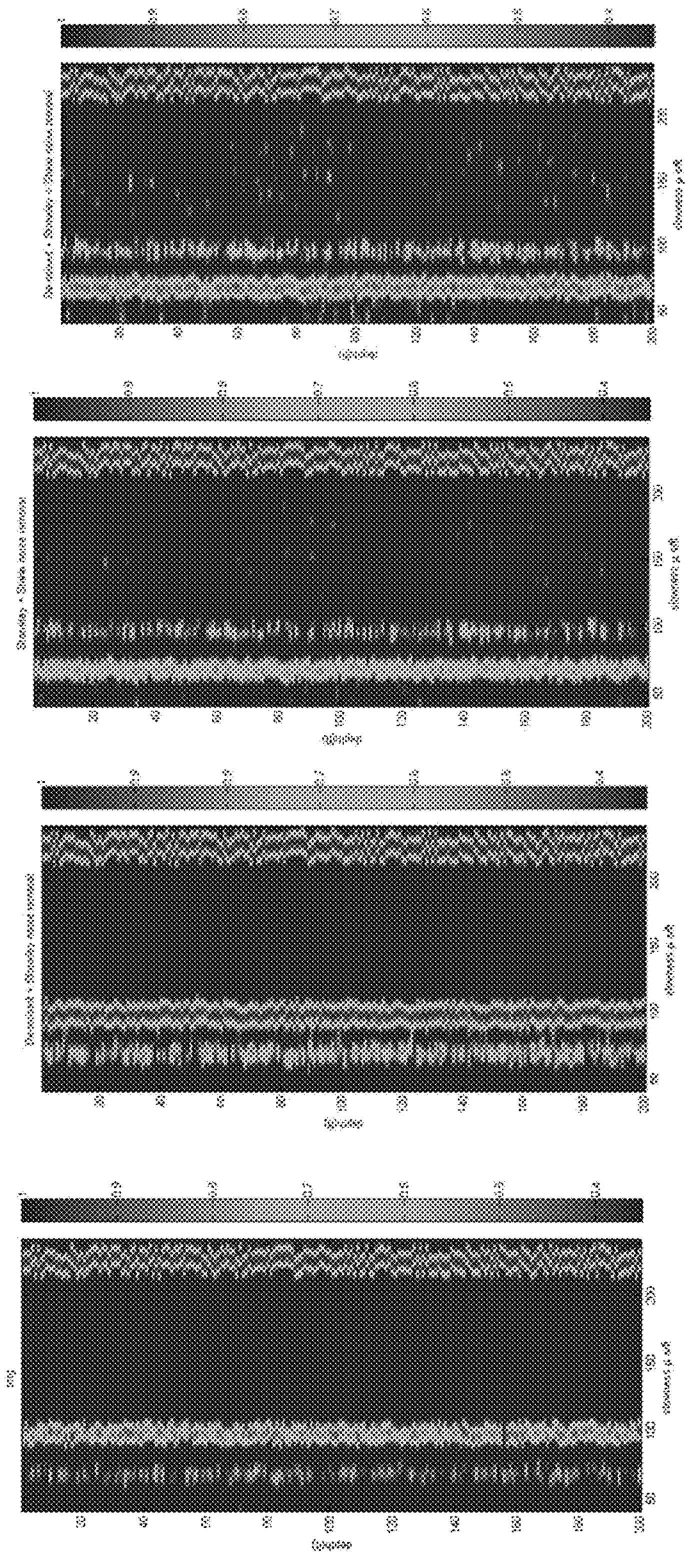
FIGS. 12*a*-12*d* compare slowness time coherence projections using synthetic data and the examples disclosed herein.
Figure 13A:
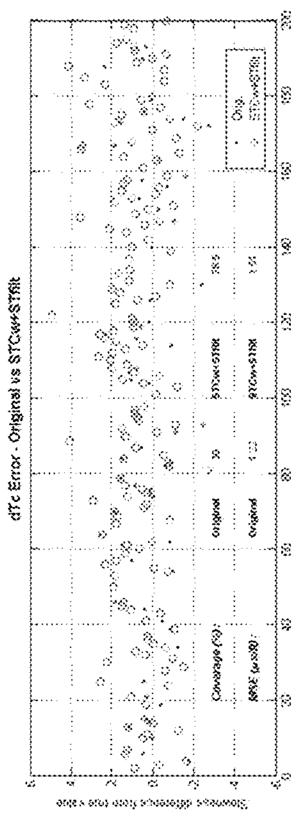
FIGS. 13*a*-13*c* illustrate slowness error performance using the examples disclosed herein for compressional slowness estimation on synthetic data.
Figure 13B:
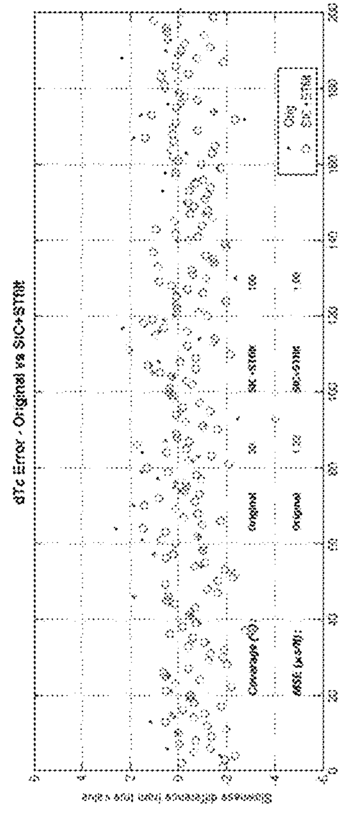
Figure 13C:
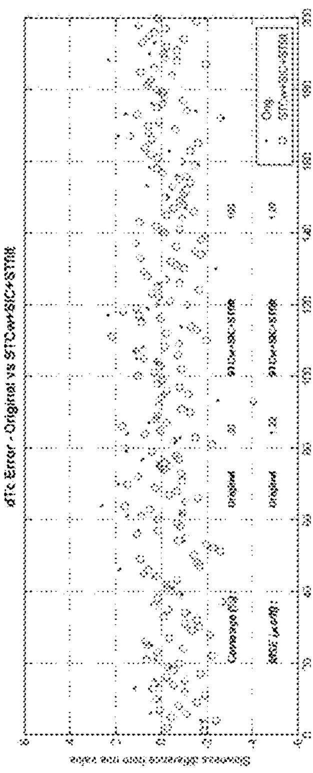

Other experiments were performed on a multi-mode data synthetic data set where three time separated waveforms were propagated at an average slowness of [6595220] to mimic the P, S and Stoneley arrivals for monopole acquisition in a fast formation. Additive noise, reflections and Stoneley and shear-type interference were added to simulate the LWD environment. During the experiments, relative energy of the signal modes and background noise and interference were selected to reflect typical values in the LWD environment. FIGS. 12 and 13 depict results using both the interference cancellation and de-noising methods. Specifically, FIG. 12*a* illustrates the original STC projection of the waveform, which poorly detects and/or covers the compressional mode. FIG. 12*b* illustrates the STC projection after the Stoneley interference removal and the shrinkage based de-noising is applied, which provides an increase in semblance of the shear and compressional waves. FIG. 12*c* illustrates the STC projection after the Stoneley and shear interference cancelation, which further improves the coverage and/or detection of the compressional log. FIG. 12*d* illustrates the STC log after Stoneley and shear LWD interference cancelation followed by de-noising, which provides high compressional semblance. FIG. 13 illustrates the slowness error performance of the proposed methods and/or algorithm for compressional estimation on the synthetic data of FIG. 12. FIG. 13*a* illustrates the performance of the Stoneley interference cancelation and de-noising on DTc slowness estimation and coverage. In this example, the coverage increased from 30% to 76% with a mild increase in the mean squared error from 1.22 μs/ft with no processing to 1.55 μs/ft. FIG. 13*b* illustrates the performance of the Stoneley and shear interference cancellation on DTc slowness estimation and coverage. In this example, the coverage increases to 100% with a decrease in mean squared error from 1.22 μs/ft with no processing to 1.08 μs/ft. FIG. 13*c* illustrates the performance of the Stoneley and shear interference cancellation followed by de-noising in the DRT domain. In this example, the coverage is 100% with further slight reduction in the mean square to 1.07 μs/ft.

Figures 14A, 14B, 14C, 14D:
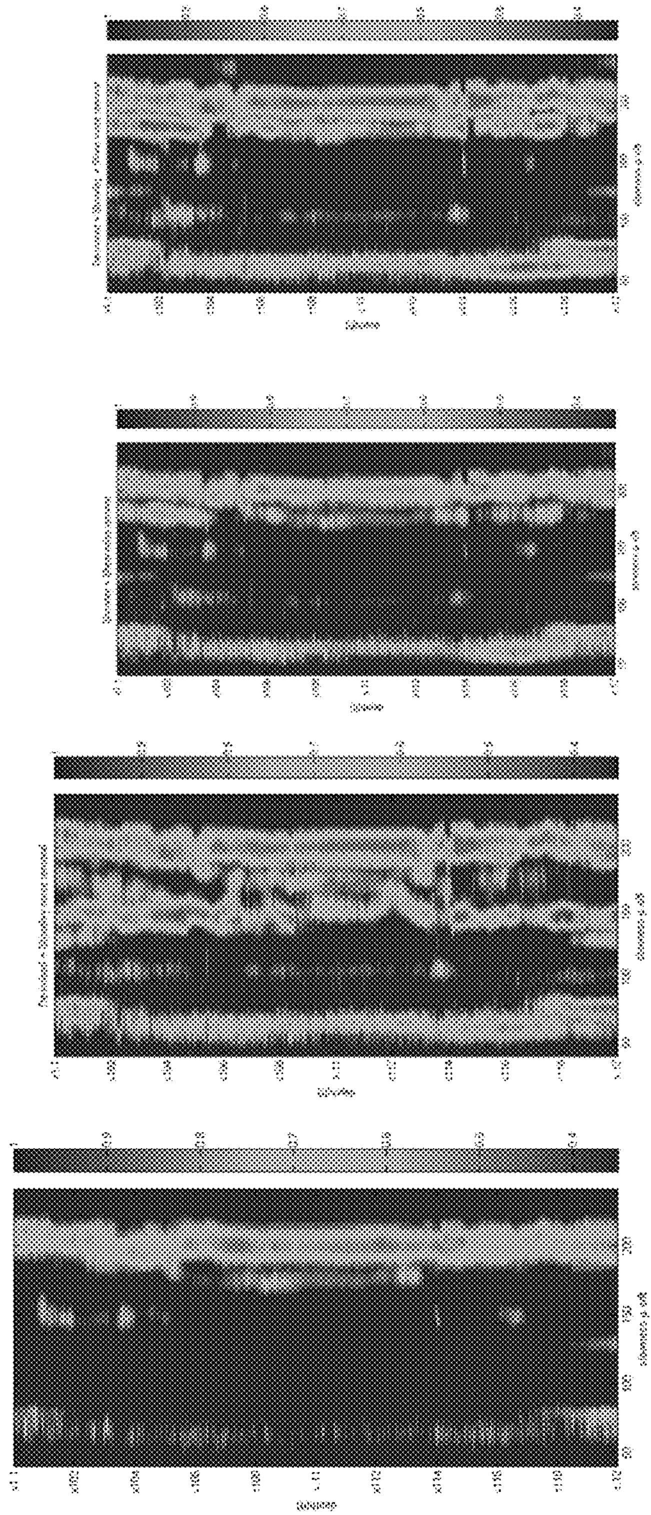
FIGS. 14*a*-14*d* illustrate performance using the examples disclosed herein and a real logging while drill data set.

FIG. 14 depicts the performance on a real LWD data set from a well in a fast formation with deviated well. In this example, the monopole data is slightly more complicated than usual as the tool is passing through a boundary with two different rock matrices with different compressional and shear slownesses. FIG. 14 illustrates the STC projection of the waveforms with current processing, which poorly detects and/or covers the compressional mode. FIG. 14*b* illustrates the STC plot after the Stoneley interference removal and the shrinkage based de-noising is applied, which provides an increase in semblance of the shear and compressional waves. FIG. 14*c* illustrates the STC plot after the Stoneley and shear interference cancelation, which further improves the coverage and/or detection of the compressional log. FIG. 14*d* illustrates the STC log after Stoneley and shear LWD interference cancelation and de-noising, which provides high compressional semblance.

Figure 15:
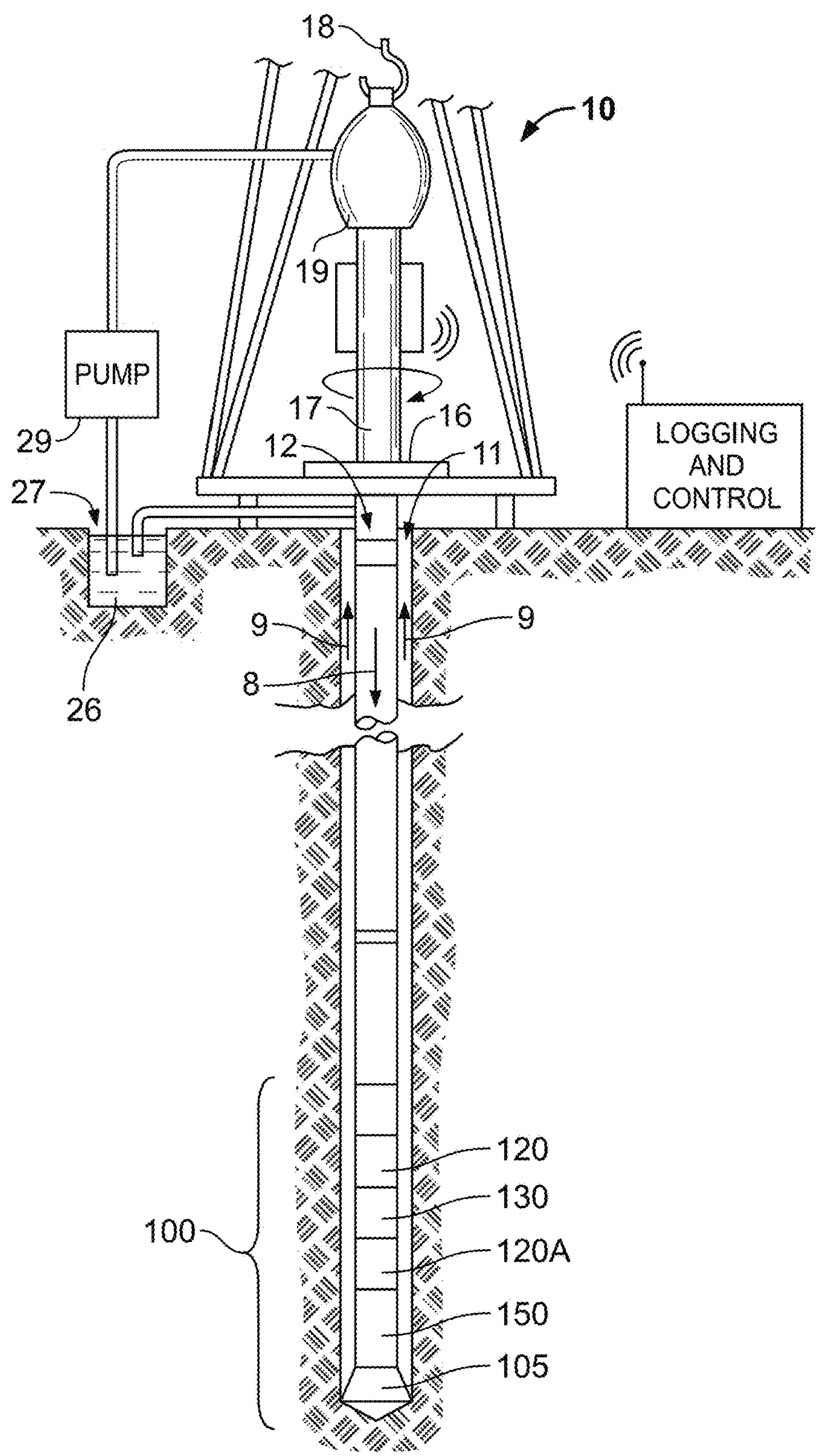
FIG. 15 illustrates an example system in which embodiments of the methods and apparatus for waveform processing may be implemented.

FIG. 15 illustrates a wellsite system in which the examples disclosed herein can be employed. The wellsite can be onshore or offshore. In this example system, a borehole 11 is formed in subsurface formations by rotary drilling. However, the examples described herein can also use directional drilling, as will be described hereinafter.

A drill string 12 is suspended within the borehole 11 and has a bottom hole assembly 100 that includes a drill bit 105 at its lower end. The surface system includes a platform and derrick assembly 10 positioned over the borehole 11. The assembly 10 includes a rotary table 16, a kelly 17, a hook 18 and a rotary swivel 19. The drill string 12 is rotated by the rotary table 16. The rotatory table 16 may be energized by a device or system not shown. The rotary table 16 may engage the kelly 17 at the upper end of the drill string 12. The drill string 12 is suspended from the hook 18, which is attached to a traveling block (also not shown). Additionally, the drill string 12 is positioned through the kelly 17 and the rotary swivel 19, which permits rotation of the drill string 12 relative to the hook 18. Additionally or alternatively, a top drive system may be used to impart rotation to the drill string 12.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 of the example illustrated in FIG. 15 includes a logging-while-drilling (LWD) module 120, a measuring-while-drilling (MWD) module 130, a roto-steerable system and motor 150, and the drill bit 105.

The LWD module 120 may be housed in a special type of drill collar and can contain one or more logging tools. In some examples, the bottom hole assembly 100 may include additional LWD and/or MWD modules. As such, references throughout this description to reference numeral 120 may additionally or alternatively include 120A. The LWD module 120 may include capabilities for measuring, processing, and storing information, as well as for communicating with the surface equipment. Additionally or alternatively, the LWD module 120 includes a sonic measuring device.

The MWD module 130 may also be housed in a drill collar and can contain one or more devices for measuring characteristics of the drill string 12 and/or drill bit 105. The MWD module 130 further may include an apparatus (not shown) for generating electrical power for at least portions of the bottom hole assembly 100. The apparatus for generating electrical power may include a mud turbine generator powered by the flow of the drilling fluid. However, other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device and/or an inclination measuring device.

Although the components of FIG. 15 are shown and described as being implemented in a particular conveyance type, the examples disclosed herein are not limited to a particular conveyance type but, instead, may be implemented in connection with different conveyance types include, for example, coiled tubing, wireline wired drillpipe and/or any other conveyance types known in the industry.

Figure 16:
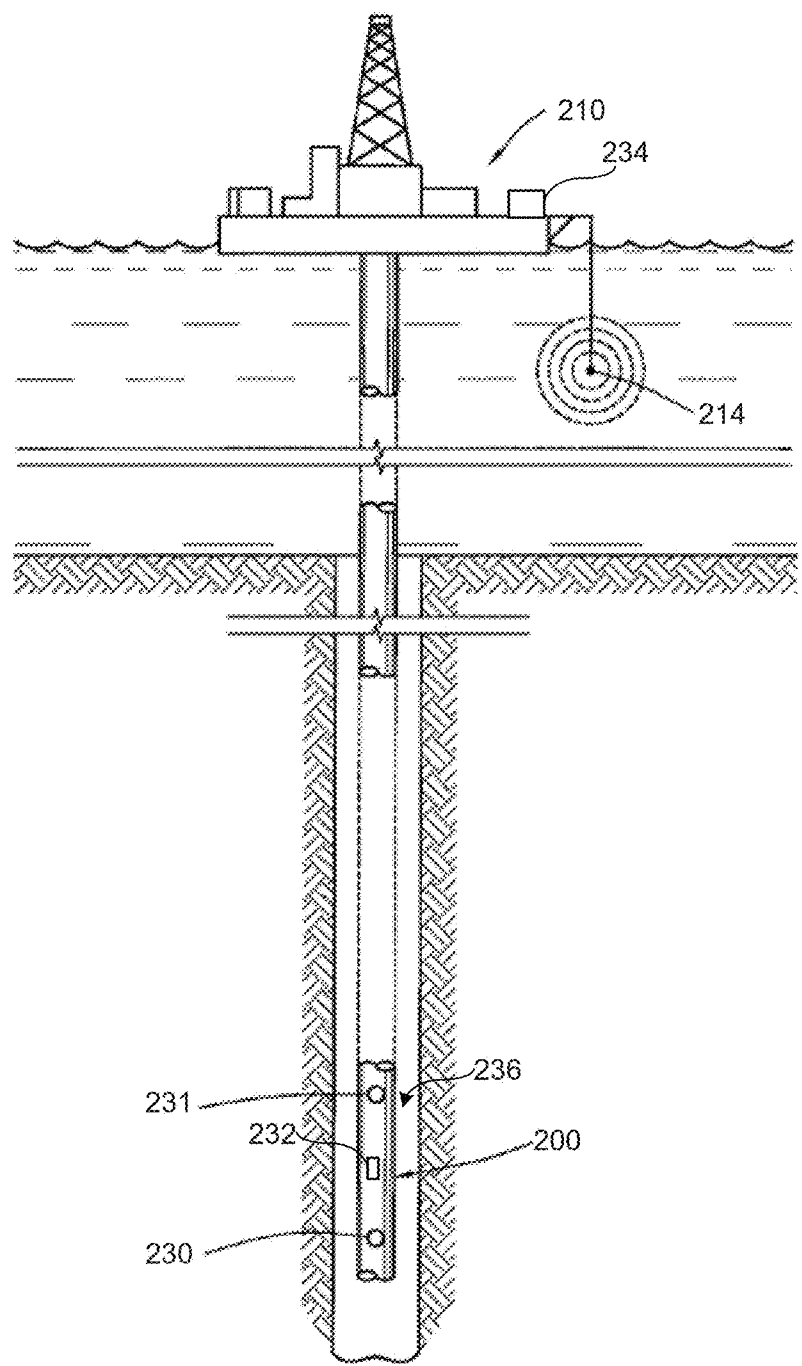
FIG. 16 illustrates another example system in which embodiments of the methods and apparatus for waveform processing may be implemented.

FIG. 16 illustrates a sonic logging-while-drilling tool that can be used to implement the LWD tool 120 or may be a part of an LWD tool suite 120A of the type described in U.S. Pat. No. 6,308,137, which is hereby incorporated herein by reference in its entirety. An offshore rig 210 having a sonic transmitting source or array 214 may be deployed near the surface of the water. Additionally or alternatively, any other type of uphole or downhole source or transmitter may be provided to transmit sonic signals. In some examples, an uphole processor controls the firing of the transmitter 214.

Uphole equipment can also include acoustic receivers (not shown) and a recorder (not shown) for capturing reference signals near the source of the signals (e.g., the transmitter 214). The uphole equipment may also include telemetry equipment (not shown) for receiving MWD signals from the downhole equipment. The telemetry equipment and the recorder are may be coupled to a processor (not shown) so that recordings may be synchronized using uphole and downhole clocks. A downhole LWD module 200 includes at least acoustic receivers 230 and 231, which are coupled to a signal processor so that recordings may be made of signals detected by the receivers in synchronization with the firing of the signal source.

In operation, the transmitter 214 transmits signals and/or waves that are received by one or more of the receivers 230, 231. The received signals may be recorded and/or logged to generate associated waveform data. The waveform data may be processed by processors 232 and/or 234 to remove noise, interference and/or reflections as disclosed herein.

Figure 17:
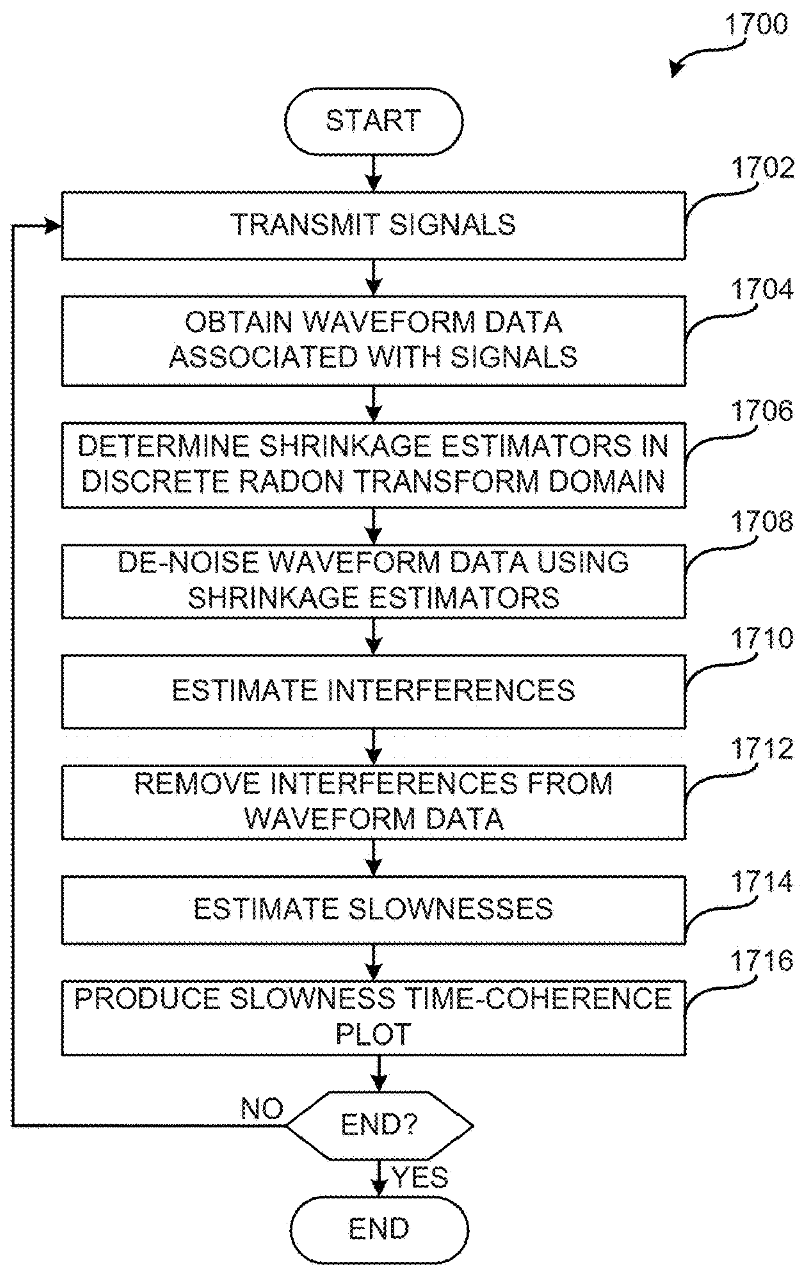
FIG. 17 depicts an example process that can be implemented using the example apparatus for waveform processing.

FIG. 17 depicts an example flow diagram representative of processes that may be implemented using, for example, computer readable and executable instructions that may be used to cancel interference in and/or de-noise waveform data. The example processes of FIG. 17 may be performed using a processor, a controller and/or any other suitable processing device. For example, the example processes of FIG. 17 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 17 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 17 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 17 may be implemented manually or as any combination(s) of any of the foregoing techniques, for example, any combination of firmware, software, discrete logic and/or hardware. Further, although the example processes of FIG. 17 are described with reference to the flow diagram of FIG. 17, other methods of implementing the processes of FIG. 17 may be employed. For example, the order of execution of the blocks may be changed, and/or some of the blocks described may be changed, eliminated, sub-divided, or combined. Additionally, any or all of the example processes of FIG. 17 may be performed sequentially and/or in parallel by, for example, separate processing threads, processors, devices, discrete logic, circuits, etc.

The example process 1700 of FIG. 17 may begin by transmitting a signal from one or more transmitters and/or sources (block 1702) and receiving the signal at one or more receivers spaced from the transmitters. In some examples, the source may be one or more monopole sources and/or multi-pole sources.

The received signals may be recorded and/or logged to generate waveform data associated with the signals (block 1704). The process 1700 may then determine shrinkage estimators in the Discrete Radon Transform domain (block 1706), which may be applied to the waveform data in the Discrete Radon Transform domain to de-noise the waveform data (block 1708) and/or obtain second waveform data. In some examples, the second waveform data may be inverted in the frequency domain and a slowness time coherence plot may be produced.

At block 1710, interference in the waveform data may be estimated using one or more space-time propagators (block 1710). The estimated interference may be removed from the waveform data (block 1712) The processed waveform data is then processed to estimate slowness such as compressional and/or shear slownesses and the plot such as a slowness time-coherence plot may be produced (blocks 1714, 1716).

Figure 18:
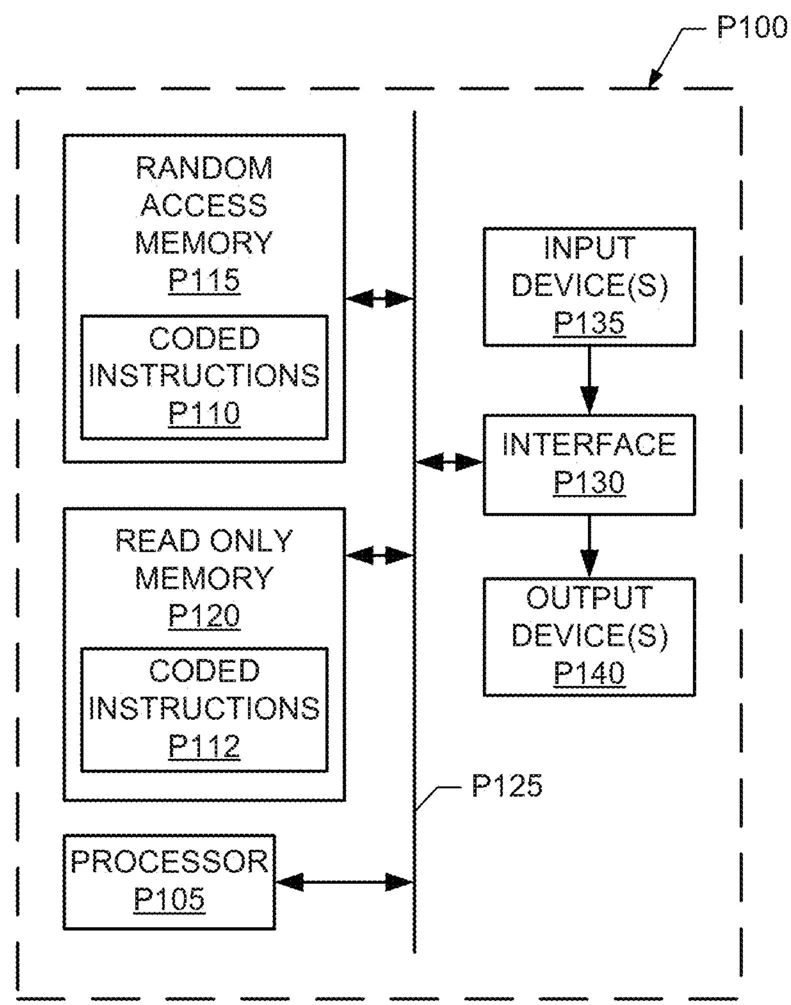
FIG. 18 is a schematic illustration of an example processor platform that may be used and/or programmed to implement any or all of the example methods are apparatus disclosed herein.

FIG. 18 is a schematic diagram of an example processor platform P100 that may be used and/or programmed to implement to implement a logging and control computer (FIG. 18), the processors 232 and/or 234 and/or any of the examples described herein. For example, the processor platform P100 can be implemented by one or more general purpose processors, processor cores, microcontrollers, etc.

The processor platform P100 of the example of FIG. 18 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

The examples disclosed herein increase semblance to enable robust detection and slowness estimation of compressional and shear head waves in a noisy environments such as logging while drill. In some examples, the Discrete Radon Transform (DRT) was used to determine space-time shrinkage operators to identify and/or remove additive noise and/or reflections (e.g., signal de-noising) To identify and/or remove the dominate Stoneley and shear-type interference on the weaker compressional in fast formation, space-time propagators were used to estimate and cancel the Stoneley and shear-type interference. The examples disclosed herein were used on synthetic and field data and substantial performance gains were observed.

The examples disclosed herein relate to detecting and slowness estimation of weak compressional (P) and shear (S) waves in borehole sonic logging in noisy environment such as logging while drilling. In some such examples, semblance of the waveform data is increased.

To de-noise waveform data, shrinkage estimators in the Discrete Radon Transform (DRT) domain may be determined from data semblance. In some examples, optimal conditions may be determined for the particular and/or proposed shrinkage estimators.

The examples disclosed herein may be used to cancel and/or remove energy and/or waves propagating at the slowness of the bore modes (e.g., the Stoneley mode, the shear mode) and to lower the semblance of the weaker head wave arrivals. Such data may be represented using time-frequency compact space-time propagators. In contrast to a slowness time masking operation in the Discrete Radon Transform domain as applied to seismic data collected with large receiver arrays, using the time-frequency compact space-time propagators may be more effective with side lobe behavior and/or mode separation due to slowness-time resolution between shear and compressional arrivals in fast formations for borehole acoustic data collected with short receiver arrays (e.g., closer together).

The examples disclosed herein may include combing the space-time shrinkage in the Discrete Radon Transform domain and the interference cancelation strategies for enhanced detection of compressional and shear waves using semblance processing. Such detection of compressional and shear waves has been validated to enhance the performance of synthetic data and LWD field data sets. The examples disclosed herein may be used for processing logging while drilling data and/or identifying weak non-dispersive acoustic signals collected by an array of receivers that includes substantial interference.

As set forth herein an example method includes determining shrinkage estimators in a Discrete Radon transform domain based on semblance of waveform data de-noising the waveform data using a processor and the shrinkage estimators to enable the identification of weak signals in the waveform data. In some examples, de-noising the waveform data includes applying the shrinkage estimators to the waveform data in the Discrete Radon transform domain to obtain second waveform data and inverting the second waveform data. In some examples, the method also includes producing a slowness time-coherence plot using the second waveform data.

In some examples, de-noising the waveform data includes removing noise or reflections from the waveform data. In some examples, the weak signals include compressional signals or shear signals. In some examples, the method also includes estimating slowness of the detected compressional signals or shear signals. In some examples, the method also includes estimating interference in the waveform data. In some examples, the method also includes removing the estimated interference from the waveform data. In some examples, removing the estimated interference from the waveform data includes subtracting the estimated interferences from the waveform data. In some examples, the interference is estimated using one or more time-frequency compact space-time propagators. In some examples, the method also includes producing a slowness time coherence plot using the de-noised waveform data. In some examples, the Discrete Radon transform domain includes a stable inverse.

Another example method includes processing waveform data using a processor to remove noise and interference from the waveform data. The noise to be removed using one or more shrinkage estimators in a Discrete Radon transform domain. The interference to be estimated using one or more time-frequency compact space-time propagators. In some examples, the shrinkage estimators are determined by the processor based on semblance of the waveform data. In some examples, processing the waveform data includes processing the waveform data in substantially real time. In some examples, removing the interference includes subtracting the estimated interference from the waveform data. In some examples, processing the waveform data further includes removing one or more reflections from the waveform data, the reflections to be removed using one or more shrinkage estimators in the Discrete Radon transform domain.

An example apparatus includes one or more sources spaced from a receiver. The one or more sources to transmit one or more signals and the receiver to receive at least a portion of the one or more signals. The apparatus also includes a processor to process waveform data to remove noise from the waveform data. The waveform data associated with the one or more signals. The noise to be removed using one or more shrinkage estimators in a Discrete Radon transform domain. In some examples, the processor is to further process the waveform data to remove interference from the waveform data. In some examples, the processor is to estimate the interference using one or more time-frequency compact space-time propagators. In some examples, the processor is to further process the waveform data to remove one or more reflections from the waveform data. In some examples, the one or more reflections are to be removed using one or more shrinkage estimators in the Discrete Radon transform domain.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method to improve sonic logging, comprising:

receiving, via a processor, acoustic waveform measurements representative of reflections off of a rock subsurface using at least one receiver on a downhole tool;

determining, via the processor, shrinkage weights in a Discrete Radon transform domain as a function of semblance of the acoustic waveform measurements and a specified number of moveouts that exceeds a finite number of receivers;

de-noising, via the processor, the acoustic waveform measurements using the shrinkage weights to enable identification of weak signals in the acoustic waveform measurements; and generating, via the processor, a log based on the weak signals in the acoustic waveform measurements, wherein the log is representative of one or more properties of the rock subsurface.

2. The method of claim 1, wherein de-noising the acoustic waveform measurements comprises applying the shrinkage weights to the acoustic waveform measurements in the Discrete Radon transform domain to obtain a second set of acoustic waveform measurements in the Discrete Radon transform domain and inverting the second set of acoustic waveform measurements to a time space domain.

3. The method of claim 2, further comprising producing a slowness time-coherence plot indicative of semblance image improvement of the acoustic waveform measurements using the second set of acoustic waveform measurements in the time space domain.

4. The method of claim 1, wherein de-noising the acoustic waveform measurements comprises removing noise or reflections from the acoustic waveform measurements.

5. The method of claim 1, wherein the weak signals comprise compressional signals or shear signals.

6. The method of claim 5, further comprising estimating slowness of the detected compressional signals or shear signals.

7. The method of claim 1, further comprising estimating interference in the acoustic waveform measurements.

8. The method of claim 7, further comprising removing the estimated interference from the acoustic waveform measurements.

9. The method of claim 8, wherein removing the estimated interference from the acoustic waveform measurements includes subtracting the estimated interferences from the acoustic waveform measurements.

10. The method of claim 7, wherein the interference is estimated using one or more time-frequency compact space-time propagators.

11. The method of claim 1, further comprising producing a slowness time-coherence plot indicative of semblance image improvement of the acoustic waveform measurements using the de-noised acoustic waveform measurements.

12. The method of claim 1, wherein inversion from the Discrete Radon transform domain comprises constructing a stable inverse by specifying the number of moveouts to be a multiple of the finite number of receivers.

13. The method of claim 1, wherein the semblance is obtained by initial slowness-time coherence processing.

14. The method of claim 1 wherein determining shrinkage weights comprises compensating shrinkage weights as to over-shrinkage side lobes with respect to a main lobe.

15. The method of claim 14 wherein the compensating comprises determining a minimum number of receivers required for a worst case Rayleigh resolution for a frequency band.

16. A method to improve sonic logging, comprising:

receiving, via a processor, acoustic waveform measurements reflected off of a rock subsurface using at least one receiver on a downhole tool;

processing, via the processor, the acoustic waveform measurements to remove noise and interference from the acoustic waveform measurements, the noise to be removed using one or more shrinkage weights in a Discrete Radon transform domain, the interference to be estimated using one or more time-frequency compact space-time propagators, wherein the shrinkage weights are a function of semblance of the acoustic waveform measurements and a specified number of moveouts that exceeds a finite number of receivers; and generating, via the processor, a log of de-noised acoustic waveform measurements based on the acoustic waveform measurements and the noise and interference from the acoustic waveform measurements, wherein the log is representative of one or more properties of the rock subsurface.

17. The method of claim 16, wherein processing the acoustic waveform measurements comprises processing the acoustic waveform measurements in substantially real time.

18. The method of claim 16, wherein removing the interference comprises subtracting the estimated interference from the acoustic waveform measurements.

19. The method of claim 16, wherein processing the acoustic waveform measurements further comprises removing one or more reflections from the acoustic waveform measurements, the reflections to be removed using one or more shrinkage weights in the Discrete Radon transform domain.

20. An apparatus, comprising:

one or more acoustic sources spaced from a number of receivers, the one or more acoustic sources to transmit one or more signals towards a rock subsurface, and the receivers to receive at least a portion of the one or more signals reflected off the rock subsurface;

a processor to:

process acoustic waveform measurements to remove noise from the acoustic waveform measurements, the acoustic waveform measurements associated with the one or more signals, the noise to be removed using one or more shrinkage weights in a Discrete Radon transform domain wherein the shrinkage weights are a function of semblance of the acoustic waveform measurements and a number of moveouts that exceeds the number of receivers; and generate a log of de-noised acoustic waveform measurements based on the acoustic waveform measurements and the noise from the acoustic waveform measurements, wherein the log is representative of one or more properties of the rock subsurface.

21. The apparatus of claim 20, wherein the processor is further configured to process the acoustic waveform measurements to remove interference from the acoustic waveform measurements.

22. The apparatus of claim 21, wherein the processor is further configured to estimate the interference using one or more time-frequency compact space-time propagators.

23. The apparatus of claim 20, wherein the processor is further configured to process the acoustic waveform measurements to remove one or more reflections from the acoustic waveform measurements.

* * * * *